(12) United States Patent
Zhu

(10) Patent No.: US 11,880,618 B2
(45) Date of Patent: Jan. 23, 2024

(54) PRINTING APPARATUS

(71) Applicant: BROTHER KOGYO KABUSHIKI KAISHA, Nagoya (JP)

(72) Inventor: Feng Zhu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/152,700

(22) Filed: Jan. 10, 2023

(65) Prior Publication Data

US 2023/0229369 A1  Jul. 20, 2023

(30) Foreign Application Priority Data

Jan. 14, 2022  (JP) .................... 2022-004342

(51) Int. Cl.
 *G06F 3/12* (2006.01)
(52) U.S. Cl.
 CPC .......... *G06F 3/1242* (2013.01); *G06F 3/1208* (2013.01); *G06F 3/1275* (2013.01)
(58) Field of Classification Search
 CPC .... G06F 3/1242; G06F 3/1208; G06F 3/1275; G06F 3/1241; G06F 3/125; B67D 7/24; G06K 15/1851
 See application file for complete search history.

(56) References Cited

U.S. PATENT DOCUMENTS

2014/0146328 A1* 5/2014 Kawaguchi .............. H04N 1/00
                                                                    358/1.2
2016/0303850 A1* 10/2016 Nakajima .............. B41J 2/2114

FOREIGN PATENT DOCUMENTS

JP   2016-168794 A   9/2016

* cited by examiner

*Primary Examiner* — John R Wallace
(74) *Attorney, Agent, or Firm* — KENEALY VAIDYA LLP

(57) ABSTRACT

A printing apparatus includes a print head, a conveyance device and a control device configured to: obtain image data each corresponding to a respective divided image; generate print data, including combining at least two lines of a plurality of lines obtained by dividing the divided image; print the print image based on the print data; determine whether to perform printing based on next print data after performing the printing based on one print data; if yes, stop printing of a predetermined number of lines from an end of the one print data when performing the printing based on the one print data; and combine a first line of the one print data and a second line of the next print data, the number of the first and the second lines corresponding to the predetermined number of the lines.

6 Claims, 20 Drawing Sheets

FIG. 12A
FIG. 12B
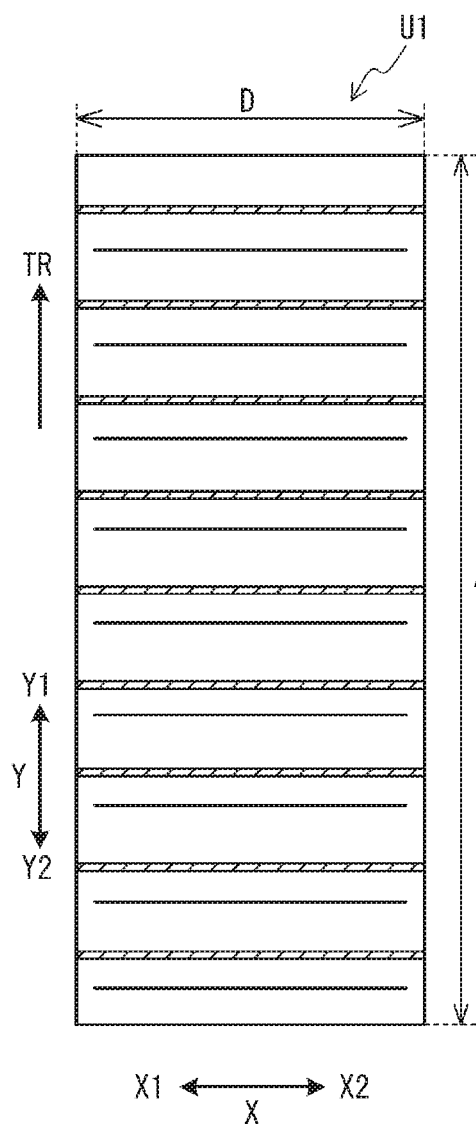
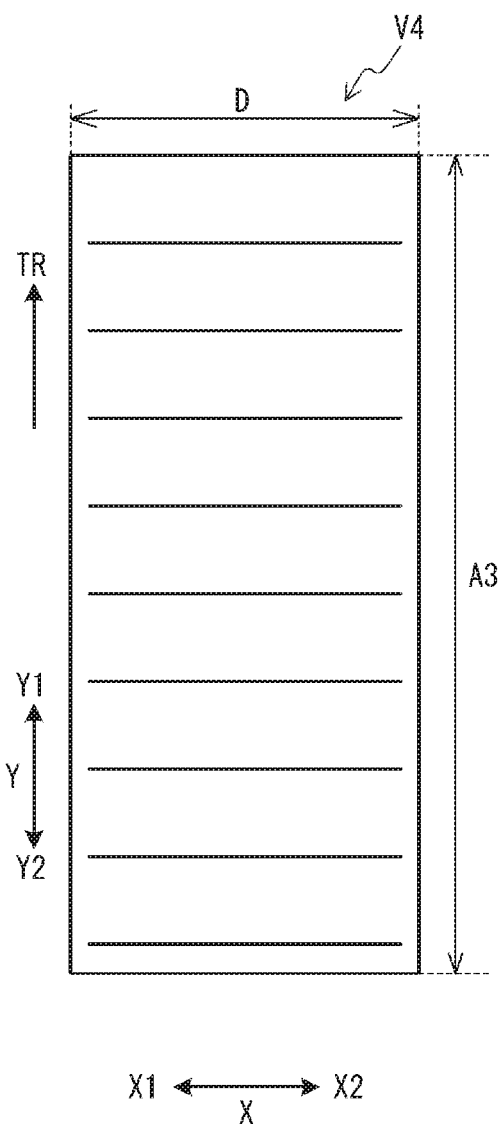

PRINTING APPARATUS

REFERENCE TO RELATED APPLICATIONS

This application claims priority from Japanese Patent Application No. 2022-004342 filed on Jan. 14, 2022. The entire content of the priority application is incorporated herein by reference.

BACKGROUND ART

A related art proposes a thermal printer that prints on thermal paper by using a thermal line head provided with a plurality of heating elements. By sequentially heating the plurality of heating elements while supplying thermal paper to the thermal head, the thermal printer prints the one dot line composing print data on the thermal paper. The thermal printer creates the print data including the dot line combined by moving the dots in the dot line with a high print rate to another dot line.

DESCRIPTION

In some cases, in a related-art thermal printer that performs printing based on print data including dot lines combined by moving dots in one dot line to another dot line, one print data may be divided into a plurality of print data for printing. In this case, it is not possible to compose the last dot line associated with the print data after the division and the first dot line associated with the print data to be printed next to the one print data. Therefore, when the printing is performed based on the plurality of divided print data, in the thermal printer, there is a possibility that an interval between the print images printed based on each print data may increase.

Illustrative aspects of the present disclosure provide a printing apparatus that can reduce an increase in an interval between print images printed based on each print data when printing is performed based on a plurality of print data.

One illustrative aspect of the present disclosure provides a printing apparatus including: a print head having a plurality of elements arranged in a main scanning direction; a conveyance device configured to relatively move a print medium and the print head in a sub-scanning direction, the sub-scanning direction intersecting the main scanning direction; and a control device configured to control the print head and the conveyance device, the control device being configured to: obtain image data, the image data corresponding to each of a plurality of divided images obtained by dividing input image in the sub-scanning direction; generate print data for printing a print image based on the image data, the print image being composed by a plurality of lines, the generating of the print data including: performing a first combining including combining at least two lines of a plurality of lines obtained by dividing the divided image in a unit of printing in the sub-scanning direction to form at least one line of the plurality of lines composing the print image; print the print image based on the generated print data, the printing of the print image including: controlling the conveyance device to relatively move the print medium and the print head in the sub-scanning direction; controlling the print head to drive the plurality of elements; and forming dots on the print medium for each line of the plurality of lines composing the print image; determine whether to perform printing based on next print data, which is next to one print data, after the printing based on the one print data; in a case the printing based on the next print data is determined to be performed, stop printing of a predetermined number of lines from an end of the one print data when performing the printing based on the one print data; and perform a second combining including combining a first line of the one print data and a second line of the next print data, the first line corresponding to the predetermined number of the lines of the one print data of which the printing is stopped, the second line corresponding to the predetermined number of the lines from a beginning of the next print data.

When performing the printing based on the next print data after the printing based on one print data, the printing apparatus according to this one illustrative aspect stops the printing of the predetermined number of lines from the end of the one print data. The printing apparatus combines the predetermined number of lines of one print data of which the printing is stopped and the predetermined number of lines from the beginning of the next print data. Accordingly, when performing the printing based on the plurality of print data, the printing apparatus can reduce an increase in an interval between the print images printed based on each print data.

Another illustrative aspect of the present disclosure provides a printing apparatus including: a print head having a plurality of elements arranged in a main scanning direction; a conveyance device configured to relatively move a print medium and the print head in a sub-scanning direction, the sub-scanning direction intersecting the main scanning direction; and a control device configured to control the print head and the conveyance device, the control device being configured to: obtain image data; determine whether the obtained image data is divided data or non-divided data, the divided data indicating each of a plurality of divided images obtained by dividing input image in the sub-scanning direction, the non-divided data indicating the input image itself; in a case the image data is determined to be the non-divided data, generate first print data for printing a first print image corresponding to the input image based on the non-divided data, the generating of the first print data including: combining at least two lines of a plurality of lines obtained by dividing the input image in a unit of printing in the sub-scanning direction to form at least one line of the plurality of lines composing the first print image; in a case the image data is determined to be the divided data, generate second print data for printing second print image corresponding to each of the divided images based on the divided data; and print the print image based on the generated first print data or the generated second print data, the printing of the print image including: controlling the conveyance device to relatively move the print medium and the print head in the sub-scanning direction; controlling the print head to drive the plurality of elements; and forming dots for each line of the plurality of lines composing the first print image or each line of a plurality of lines composing the second print image.

The printing apparatus according to this another illustrative aspect performs the combining when the image data is non-divided data and does not perform the combining when the image data is divided data. Accordingly, when performing the printing based on the plurality of print data, the printing apparatus can reduce an increase in the interval between the print images printed based on each print data by combining at least two lines in the input image.

FIGS. 7A and 7B are diagrams illustrating a shifting process.

FIGS. 12A and 12B are diagrams illustrating a thinning process.

Figure 1:
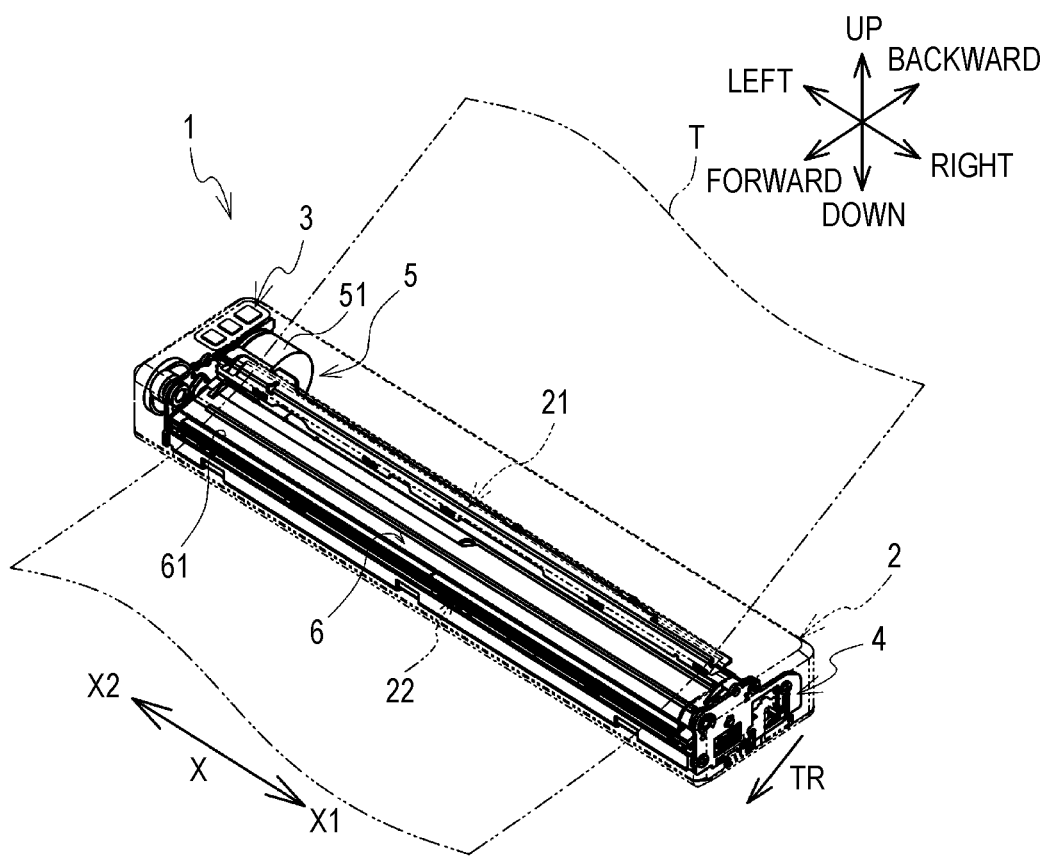
FIG. 1 is an explanatory diagram of a printing apparatus 1.

A printing apparatus 1 according to the first embodiment of the present invention will be described with reference to the drawings. The drawings are used to explain technical characteristic that can be employed by the present disclosure. That is, configuration and control of the device described in the drawings are merely illustrative examples, not limited thereto.

As illustrated in FIG. 1, the printing apparatus 1 is a thermal printer configured to print characters (objects such as letters, symbols, numbers, and graphics) on a print medium T. The print medium T is not limited to a specific medium, but is, for example, sheet-shaped or tape-shaped, and in this embodiment, the print medium T is roll paper around which a thermal recording medium is rolled.

The printing apparatus 1 includes a case 2, an input device 3, a communication device 4, a conveyance device 5, and a print head 6. The case 2 has a rectangular parallelepiped shape, and is longer in a left-right direction than in a front-rear direction and an up-down direction. The case 2 accommodates the conveyance device 5 and the print head 6. The case 2 detachably accommodates a power supply 10 illustrated in FIG. 2. The power supply 10 supplies power to the printing apparatus 1. An insertion port 21 is formed on an upper surface of the case 2, and an ejection port 22 is formed on a front surface of the case 2. Each of the insertion port 21 and the ejection port 22 is formed in a rectangular shape elongated in the left-right direction. The print medium T is inserted into the printing apparatus 1 through the insertion port 21 and ejected from the printing apparatus 1 through the ejection port 22. The input device 3 is provided near a left edge of the upper surface of the case 2. The input device 3 includes a plurality of push buttons. The communication device 4 is a USB jack provided on a right side surface of the case 2. A connector of the USB cable can be connected to the communication device 4.

Figure 2:
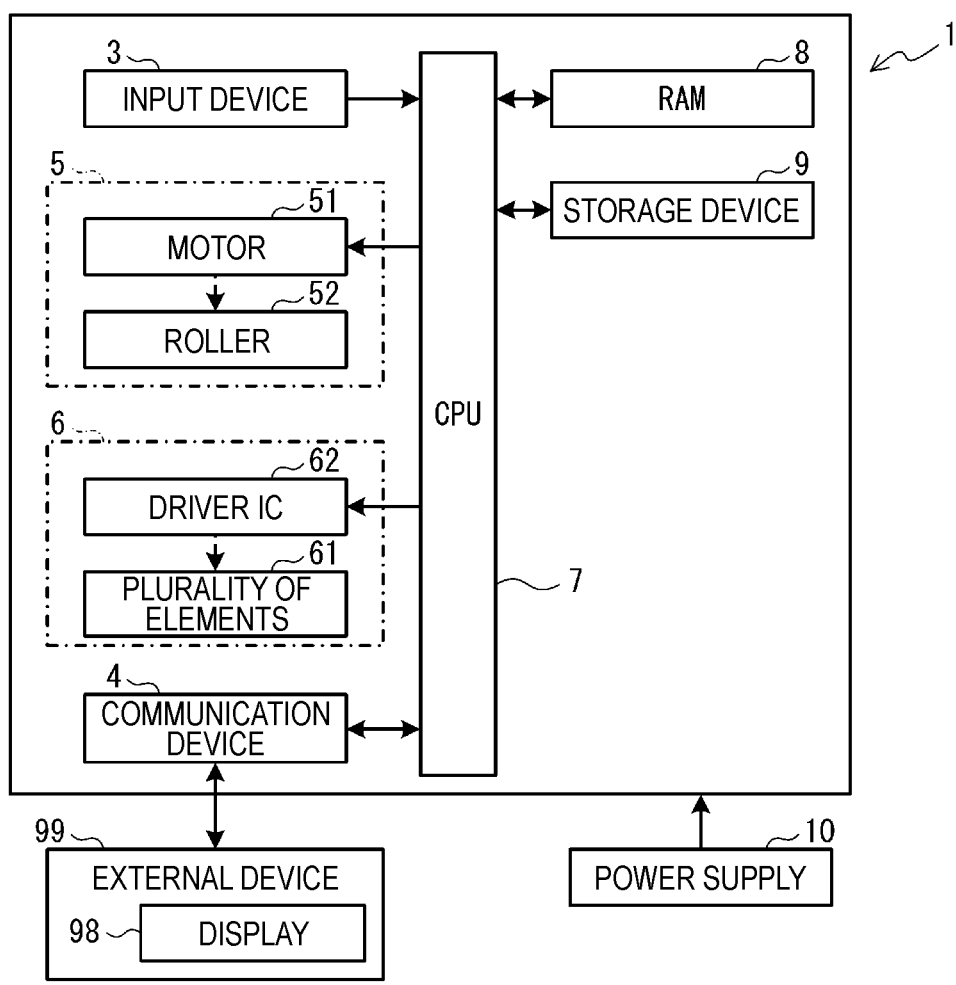
FIG. 2 is a block diagram illustrating an electrical configuration of the printing apparatus 1.
Figure 3:
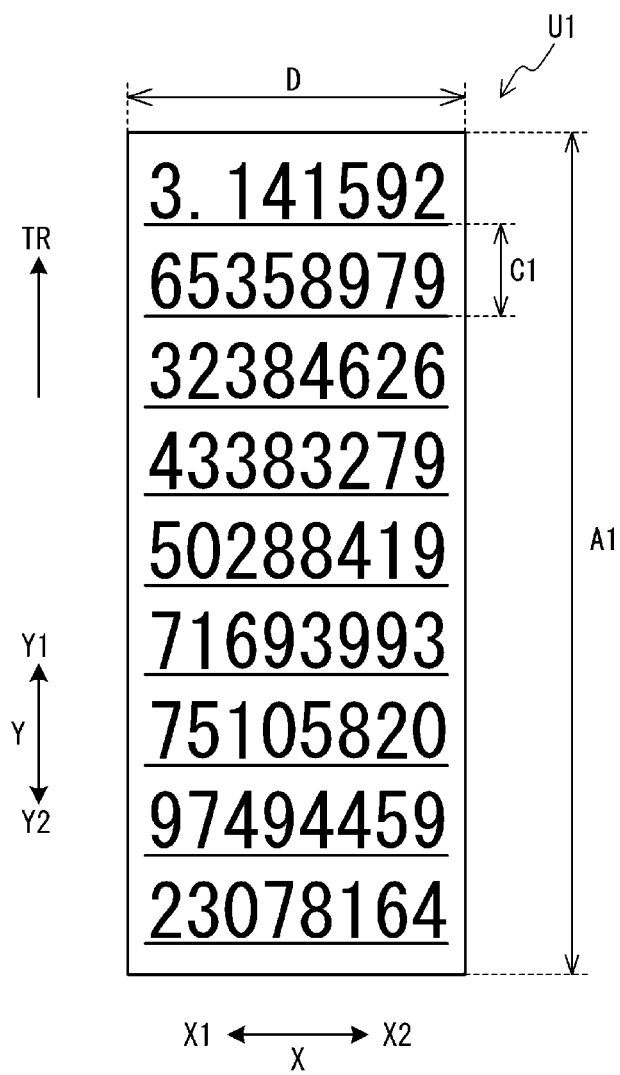
FIG. 3 is a diagram illustrating input image U1.

The conveyance device 5 includes a motor 51 and a roller 52 illustrated in FIG. 2. The roller 52 has a roller shape centering on an axis extending in the left-right direction and is provided to be oblique forward in the case 2. The motor 51 rotates the roller 52. The conveyance device 5 moves the print medium T relative to the print head 6 by conveying the print medium T in a conveying direction TR due to the rotation of the rollers 52. The conveying direction TR is a direction perpendicular to the left-right direction, and in the present embodiment, extends backward-obliquely upward and forward-obliquely downward. Hereinafter, in the conveying direction TR, the backward-obliquely upward is referred to as an upstream side, and the forward-obliquely downward is referred to as a downstream side.

The print head 6 is provided below the roller 52. The print head 6 is the line head and includes a plurality of elements 61 and a driver IC 62 illustrated in FIG. 2. Each of the plurality of elements 61 of this embodiment is a heating element that generates heat due to energization. The plurality of elements 61 contact the print medium T pressed downward by the roller 52 and generate heat to perform printing on the print medium T. The driver IC 62 is configured to selectively energize the plurality of elements 61 to generate heat.

The electrical configuration of the printing apparatus 1 will be described with reference to FIG. 2. The printing apparatus 1 includes a CPU 7, a RAM 8, a storage device 9, the communication device 4, the input device 3, the conveyance device 5, and the print head 6. The conveyance device 5 includes the motor 51 and the roller 52. The print head 6 includes the driver IC 62 and the plurality of elements 61. The CPU 7 controls the printing apparatus 1. The CPU 7 is electrically connected to the RAM 8, the storage device 9, the communication device 4, the input device 3, the motor 51, and the driver IC 62. The RAM 8 stores temporary data such as various variables. The storage device 9 stores a program executed by the CPU 7 to control the printing apparatus 1, print data, and various setting information. The communication device 4 is a controller for executing communication with an external device 99 via a USB cable. The external device 99 is, for example, a known information processing device such as a PC, a tablet PC, and a smart phone. The external device 99 has a display 98. The display 98 displays an image according to instructions transmitted by the CPU 7 via the communication device 4.

The printing operation by the printing apparatus 1 will be described. The printing apparatus 1 selectively energizes the plurality of elements 61 of the print head 6 according to the print data. The print data includes an instruction to energize and an instruction to stop energization for each of the plurality of elements 61. Thermal energy is applied to portions of the print medium T that are in contact with the plurality of energized elements 61. Accordingly, the printing apparatus 1 forms pixel columns aligned in a main scanning direction X corresponding to an arrangement of the plurality of elements 61. The printing apparatus 1 intermittently energizes the plurality of elements 61 multiple times while rotating the rollers 52 by the motor 51 to convey the print medium T downstream in the conveying direction TR. As a result, a plurality of lines are formed on the print medium T in a direction perpendicular to a direction in which the pixels are arranged in the image for one line. The plurality of lines form the print image by applying shading on the print medium T depending on whether or not each pixel is formed. The above operation is referred to as "printing operation".

In the following description, a direction in which the plurality of elements 61 are arranged is referred to as a "main scanning direction X", and a unit of printing corresponding to one pixel column arranged in the main scanning direction X is referred to as "line". A direction in which a plurality of the lines are arranged is referred to as a "sub-scanning direction Y". The sub-scanning direction Y is defined by the conveying direction TR. A unit of printing corresponding to each of the plurality of elements 61 is referred to as a "dot".

Printing by the printing apparatus 1 will be described with reference to FIGS. 3 to 14. In an example illustrated in FIG. 3, the printing is performed on the print medium T based on input image U1. The print medium T is roll paper of which a longitudinal direction is parallel to the sub-scanning direction Y A length of the print medium T in the main scanning direction X is B (refer to FIG. 5).

The left-right direction of the input images U1 and U2 (refer to FIG. 14A) corresponds to the main scanning direction X, and the up-down direction of the input images U1 and U2 corresponds to the sub-scanning direction Y. The left direction of the input images U1 and U2 corresponds to the one side X1 in the main scanning direction, and the right direction of the input images U1 and U2 corresponds to the other side X2 in the main scanning direction. The upper side of the input images U1 and U2 corresponds to the downstream side Y1 in the sub-scanning direction, and the lower side of the input images U1 and U2 corresponds to the upstream side Y2 in the sub-scanning direction. The input images U1 and U2 have rectangular shapes extending in the main scanning direction X and the sub-scanning direction Y.

The longitudinal direction of the input image U1 is the sub-scanning direction Y. A length of the input image U1 in the sub-scanning direction Y is A1, and a length of a printable area N1 in the main scanning direction X is D. A plurality of ruled lines extending in the main scanning direction X are arranged in the input image U1. The plurality of ruled lines are arranged in the sub-scanning direction Y to be spaced from each other by an interval of a length C1. Numbers and symbols are arranged in the main scanning direction X on the downstream side Y1 in the sub-scanning direction of each ruled line.

Figure 4:
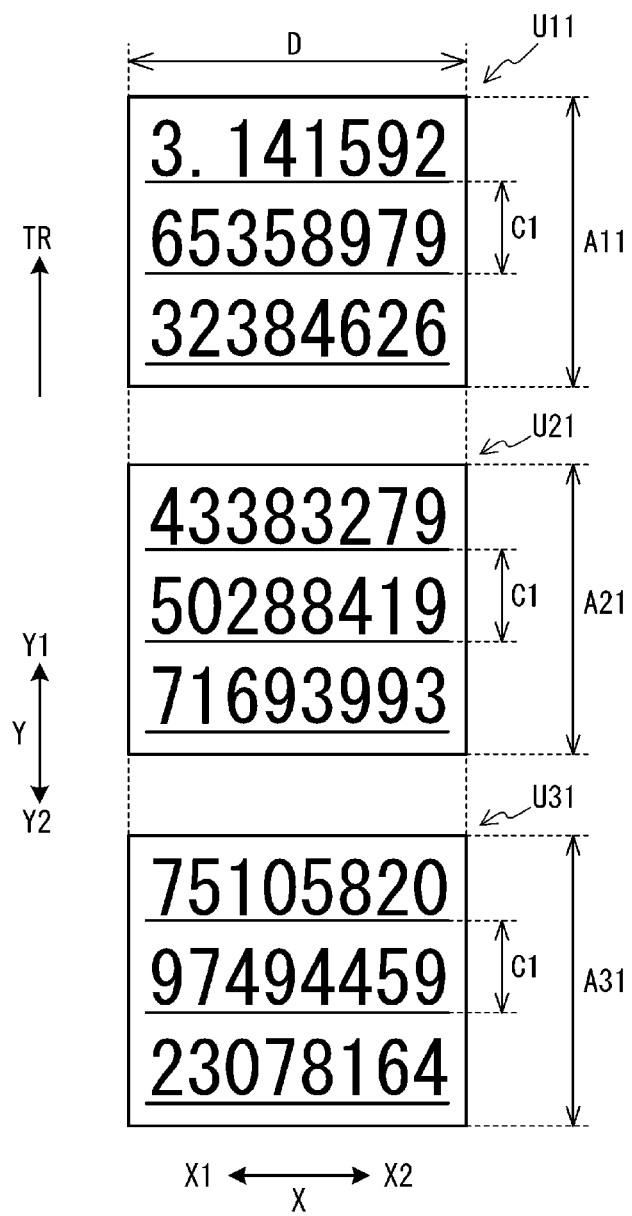
FIG. 4 is a diagram illustrating divided images U11, U21, and U31.

In some cases, the printing apparatus 1 may print the input image U1 as it is as the print image. On the other hand, in some cases, the printing apparatus 1 may print the print image based on the divided images obtained by dividing the input image U1 in the sub-scanning direction Y. As illustrated in FIG. 4, the printing apparatus 1 prints the print images V11, V21, and V31 (refer to FIG. 5) based on three divided images U11, U21, and U31 of the input image U1. Hereinafter, printing by the printing apparatus 1 based on the divided images U11, U21, and U31 is referred to as "executing line printing".

When the divided image U1*l*, the divided image U21, and the divided image U31 are arranged in this order from the downstream side Y1 in the sub-scanning direction, the three divided images U1*l*, U21, and U31 match the input image U1. Lengths of the divided images U11, U21, and U31 in the sub-scanning direction Y are A11, A21, and A31, respectively. A sum of the lengths of the divided images U11, U21, and U31 in the sub-scanning direction Y is equal to a length of the input image U1 in the sub-scanning direction Y (A11+A21+A31=A1). Similarly to the input image U1, the intervals between the plurality of ruled lines in the divided images U1*l*, U21, and U31 are the length C1.

Figure 5:
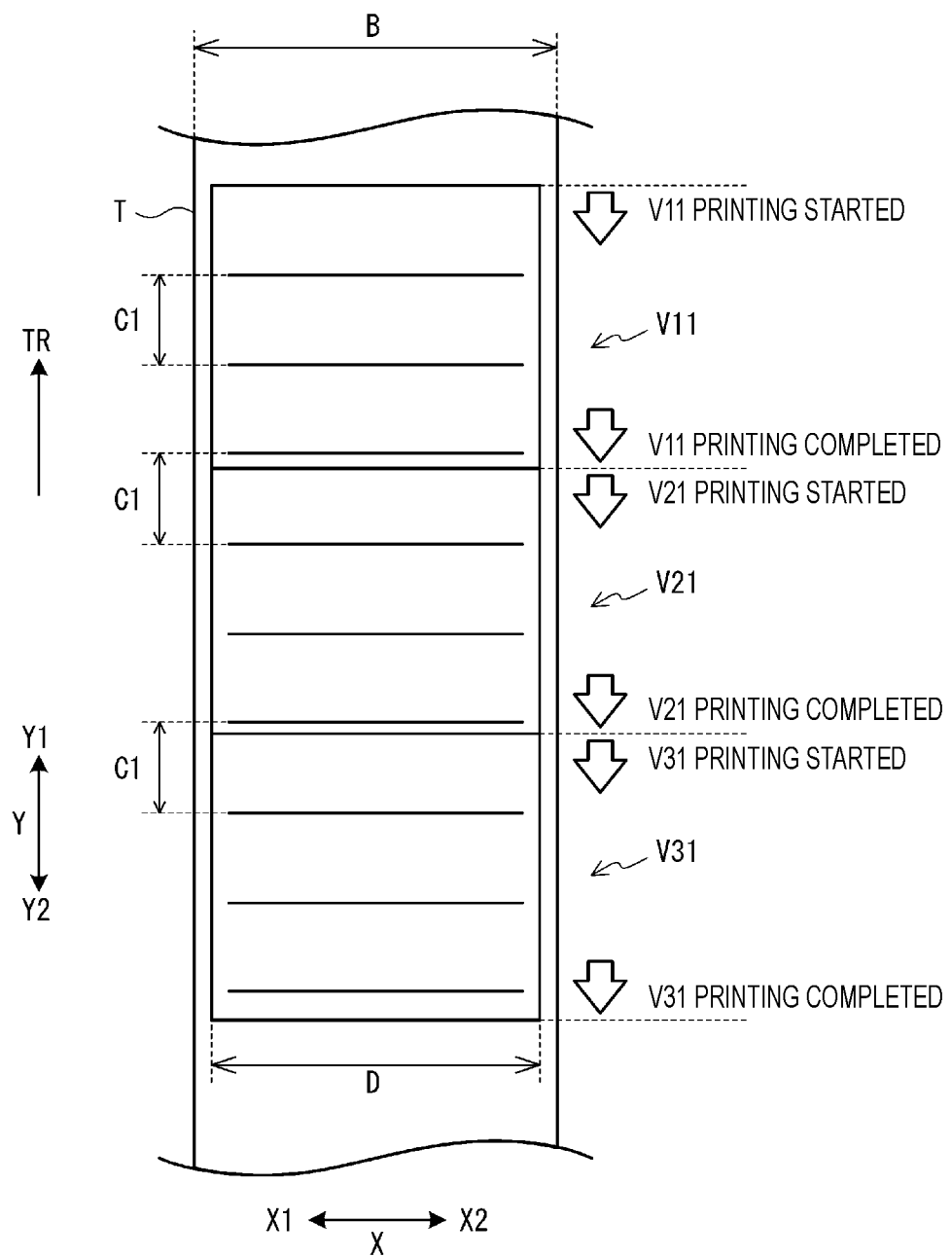
FIG. 5 is an explanatory diagram of a case where line printing is executed based on print images V11, V21, and V31.

As illustrated in FIG. 5, when executing the line printing, the printing apparatus 1 prints the print image V11, the print image V21, and the print image V31 in this order. After completing the printing of the print image V11, the printing apparatus 1 starts printing the print image V21. After completing the printing of the print image V21, the printing apparatus 1 starts printing the print image V31. On the printed print medium T, the interval between the ruled lines of the print image V11 on the upstream side Y2 in the sub-scanning direction and the ruled lines of the print image V21 on the downstream side Y1 in the sub-scanning direction is the length C1. On the printed print medium T, the interval between the ruled lines of the print image V21 on the upstream side Y2 in the sub-scanning direction and the ruled lines of the print image V31 on the downstream side Y1 in the sub-scanning direction is the length C1. A combination of the printed print images V11, V21, and V31 is the same image as the case where the input image U1 is printed as the print image, as it is.

In addition, in some cases, by moving dots composing the lines of the input image U1 to another line, the printing apparatus 1 prints the line obtained by combining the dots of the plurality of lines as dots composing the lines of the print image. As an example, the printing apparatus 1 shifts the dots composing the lines of the input image U1 to the upstream side Y2 in the sub-scanning direction. Accordingly, the printing apparatus 1 can reduce the peak number of the plurality of elements 61 to be energized and can perform the printing at the higher printing speed than the case where the dots are not shifted. Hereinafter, shifting the dots composing the input image in the sub-scanning direction Y by the printing apparatus 1 is referred to as "performing a shifting process".

Figure 6A:
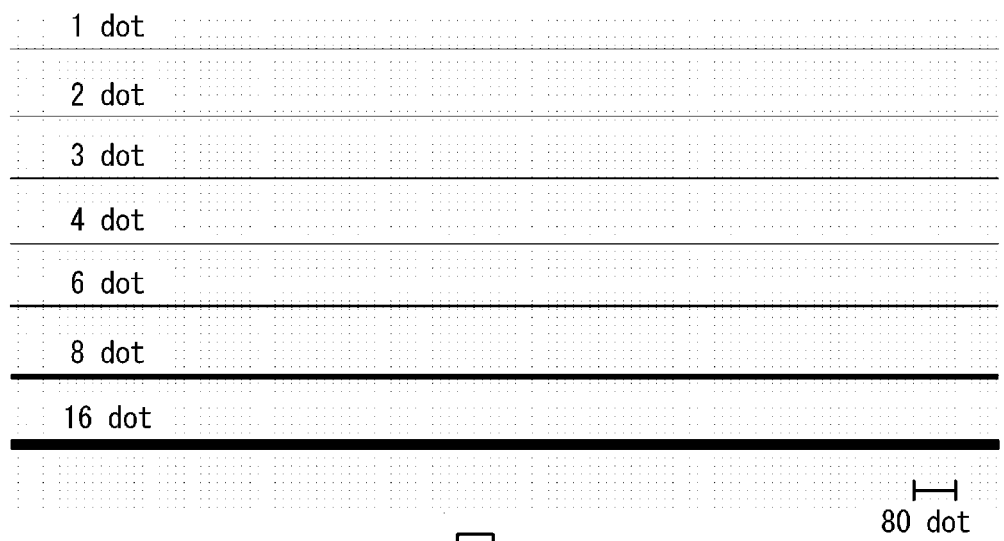
FIGS. 6A and 6B are explanatory diagrams of a case where dots composing the input image are shifted in a sub-scanning direction Y.
Figure 6B:
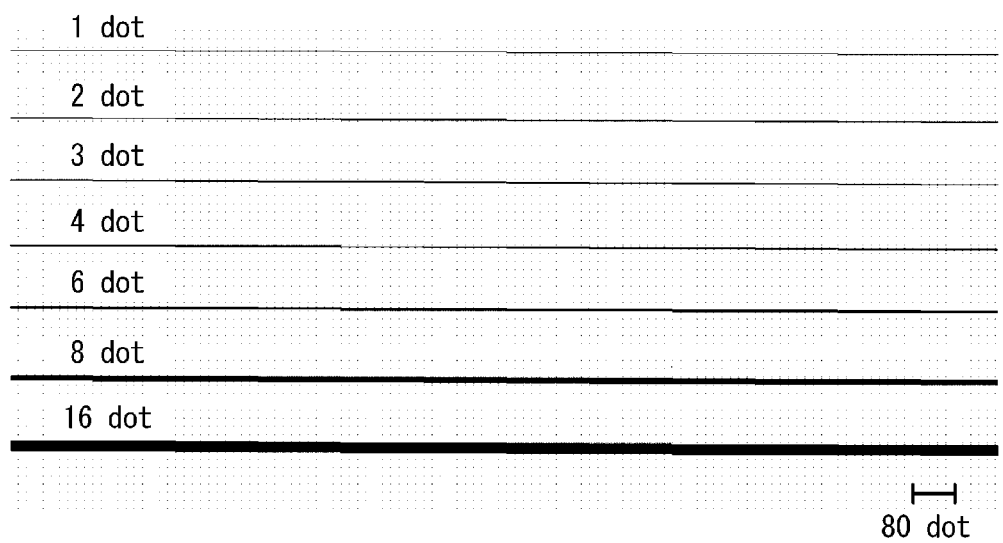
Figure 6B:
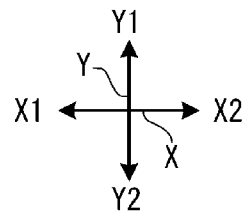

In an example of the shifting process illustrated in FIGS. 6A and 6B, the shifting process is performed on ruled lines extending in the main scanning direction X and having thicknesses of 1 dot, 2 dots, 3 dots, 4 dots, 6 dots, 8 dots, and 16 dots as the input image. FIG. 6A illustrates the input image before the shifting process is performed. FIG. 6B illustrates the print image obtained by performing the shifting process on the input image.

In the printing apparatus 1, the dots are shifted to the upstream side Y2 in the sub-scanning direction by the shifting process. The amount by which the dots are shifted to the upstream side Y2 in the sub-scanning direction increases toward the other side X2 in the main scanning direction of the input image. As the dots are shifted by the shifting process, the print image is allowed to be oblique to the other side X2 in the main scanning direction and to the upstream side Y2 in the sub-scanning direction in comparison with the input image. In the input image, the dots of the edge on the other side X2 in the main scanning direction are shifted most to the upstream side Y2 in the sub-scanning direction. In the printable area N1, a maximum value of the amount by which dots are shifted in the sub-scanning direction Y due to the shifting process is referred to as the "shift amount L". In this embodiment, the shift amount L is 150 μm. An oblique angle θ of the input image due to the shifting process is $\theta=\arctan(L/D)$. The shift amount L is a sufficiently small value with respect to a length D of the printable area N1 in the main scanning direction X. Therefore, it is difficult for a user to visually check that the print image is oblique.

Figures 7A, 7B:
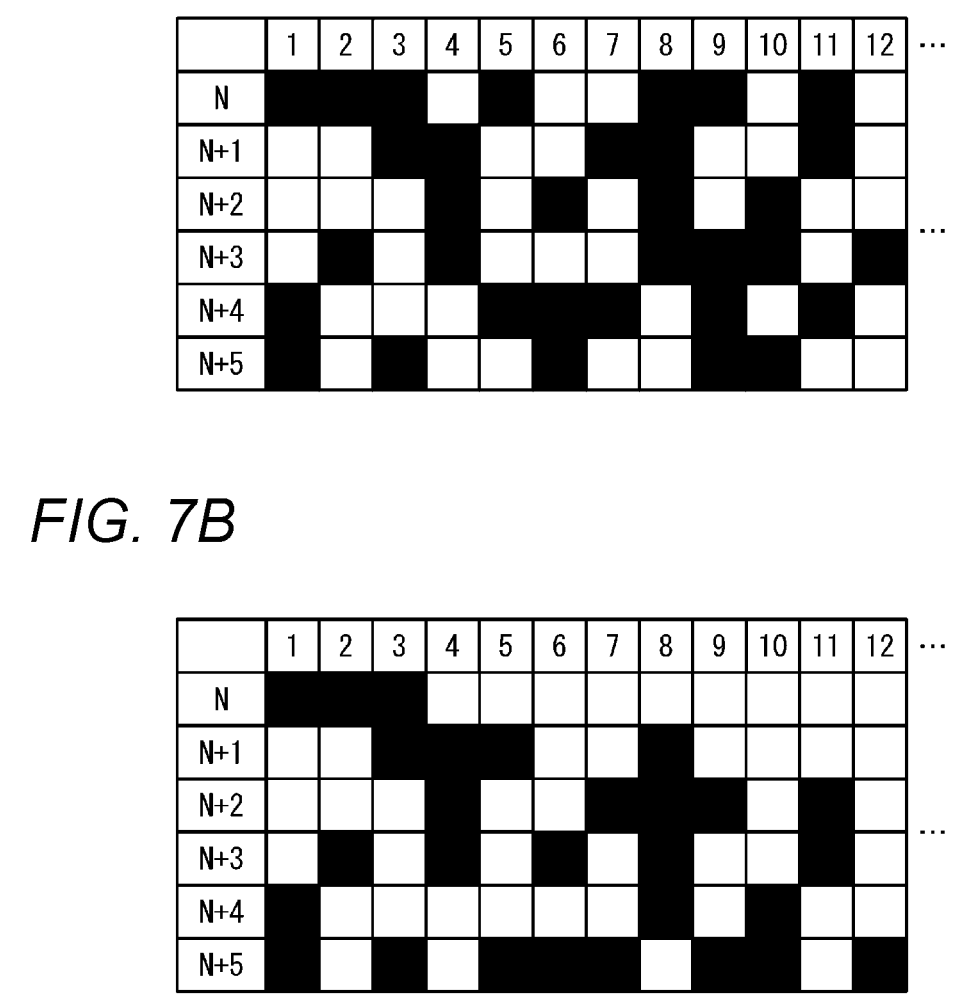

As another example of the shifting process, the dots composing the lines illustrated in FIG. 7A are shifted to form the line illustrated in FIG. 7B. In FIGS. 7 and 14, the left-right direction and the up-down direction correspond to the main scanning direction X and the sub-scanning direction Y, respectively. Column names indicated by numerals are identification numbers (hereinafter referred to as element numbers) assigned to each of the plurality of elements 61 in order from one side X1 in the main scanning direction. Line names indicated by numerals are identification numbers (hereinafter referred to as line numbers) of lines printed by the element 61 in order from the downstream side Y1 in the sub-scanning direction. The printing apparatus 1 forms images on the print medium T in ascending order of line numbers. Some portions of the plurality of dots corresponding to the print data are illustrated in a matrix shape, and the formed dots are illustrated in black.

The line illustrated in FIG. 7B contains the dots of element numbers 1 to 4 shifted by 0 dots to the upstream side Y2 in the sub-scanning direction, the dots of element numbers 5 to 8 shifted by 1 dot to the upstream side Y2 in the sub-scanning direction, and the dots of the element numbers 9 to 12 shifted by 2 dots to the upstream side Y2 in the sub-scanning direction from the dots composing the lines illustrated in FIG. 7A. After the shifting process is performed, for example, the line with line number (N+2) illustrated in FIG. 7B is the line obtained by combining the line with line number (N+2), the line with line number (N+1), and the line with line number N illustrated in FIG. 7A. After the shifting process is performed, the line with line number (N+2) illustrated in FIG. 7B contains the dots of element numbers 1 to 4 with line number (N+2), the dots of element numbers 5 to 8 with line number (N+1), and the dots of element numbers 9 to 12 with line number N illustrated in FIG. 7A.

Figure 8:
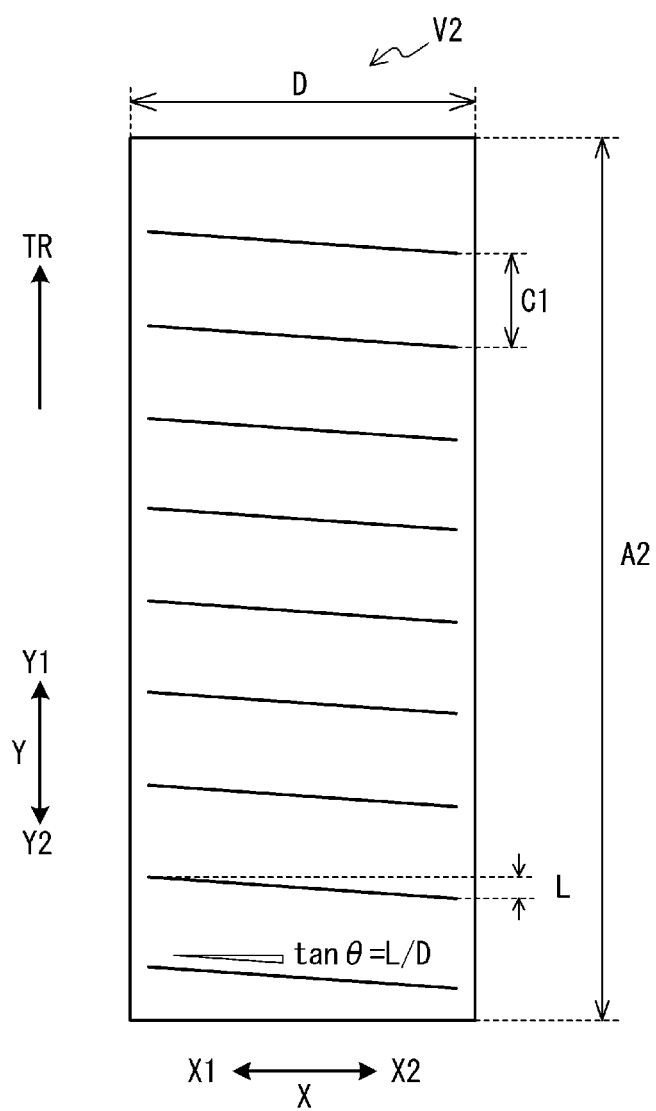
FIG. 8 is a diagram illustrating a print image V2.

The print image V2 illustrated in FIG. 8 is the image obtained by performing the shifting process on the input image U1. For the ease of understanding, FIGS. 8 to 12 illustrate only the plurality of ruled lines in the input image and the print image, and numerals and symbols are omitted. In the print image V2, the ruled line is oblique with a size of the oblique angle θ (θ=arctan(L/D)) toward the other side X2 in the main scanning direction and the upstream side Y2 in the sub-scanning direction. Since the dots are shifted by the shifting process, a length A2 of the print image V2 in the sub-scanning direction Y becomes longer than a length A1 (refer to FIG. 3) of the input image U1 in the sub-scanning direction Y (A2>A1). Since the full print image V2 is oblique, the interval between the ruled lines is the same length C1 as the input image U1.

Figure 9:
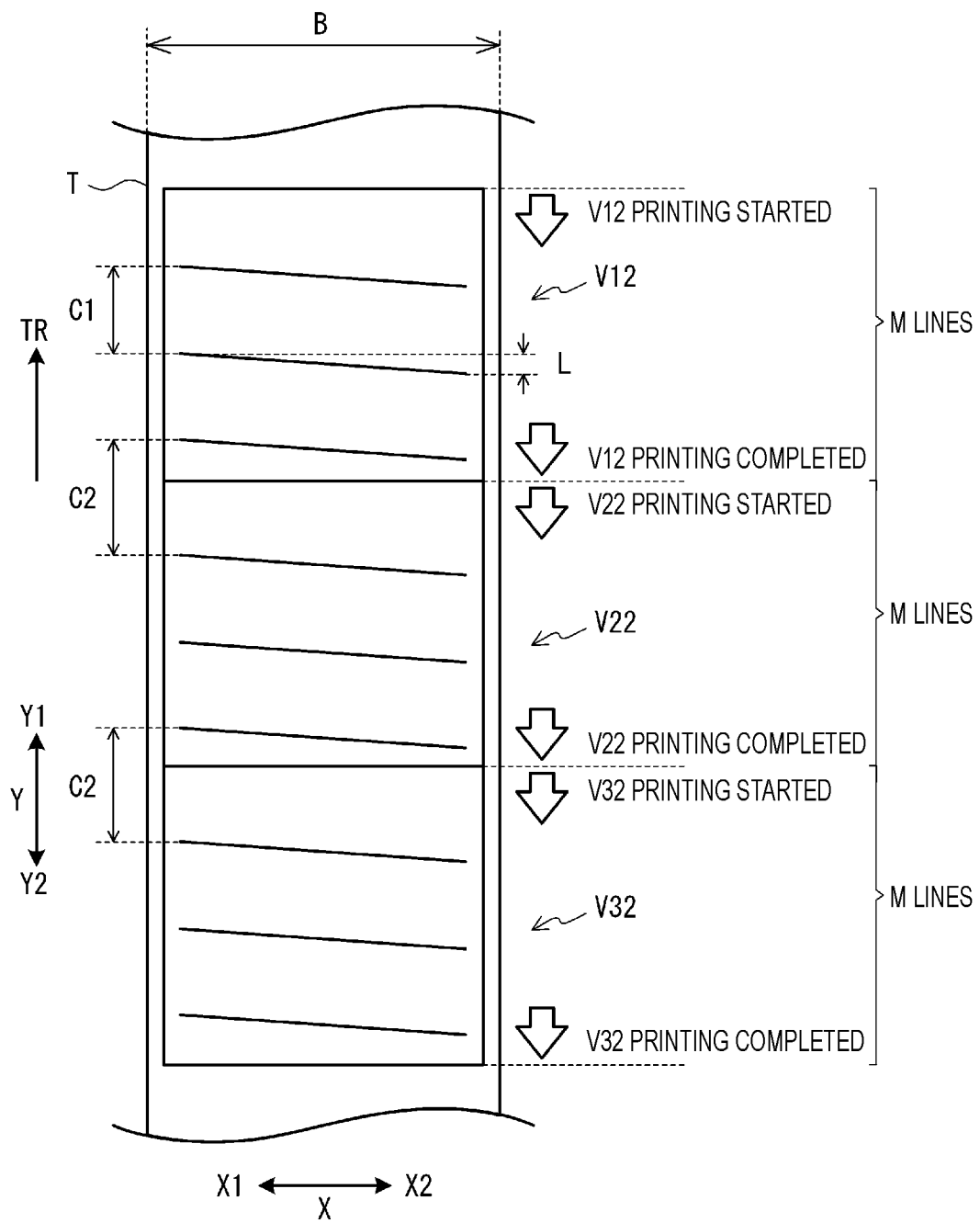
FIG. 9 is an explanatory diagram of the case where line printing is executed based on print images V12, V22, and V32.

In some cases, as illustrated in FIG. 9, the printing apparatus 1 may print the print images V12, V22, and V32 obtained by performing the shifting process on the divided images U11, U21, and U31 on the print medium T. Similarly to print images V11, V21, and V31, the print images V12, V22, and V32 are printed in the order of the print images V12, V22, and V32. The number of lines of each of the print images V11, V21, and V31 is M.

In the related art, when completing the printing of the print image V12, the printing apparatus starts printing the print image V22. When completing the printing of the print image V22, the printing apparatus starts printing the print image V32. Therefore, the interval between the ruled lines of the print image V12 on the upstream side Y2 in the sub-scanning direction and the ruled lines of the print image V22 on the downstream side Y1 in the sub-scanning direction is a length C2, which is larger than the length C1. The interval between the ruled lines of the print image V22 on the upstream side Y2 in the sub-scanning direction and the ruled lines of the print image V32 on the downstream side Y1 in the sub-scanning direction is also the length C2.

Figure 10:
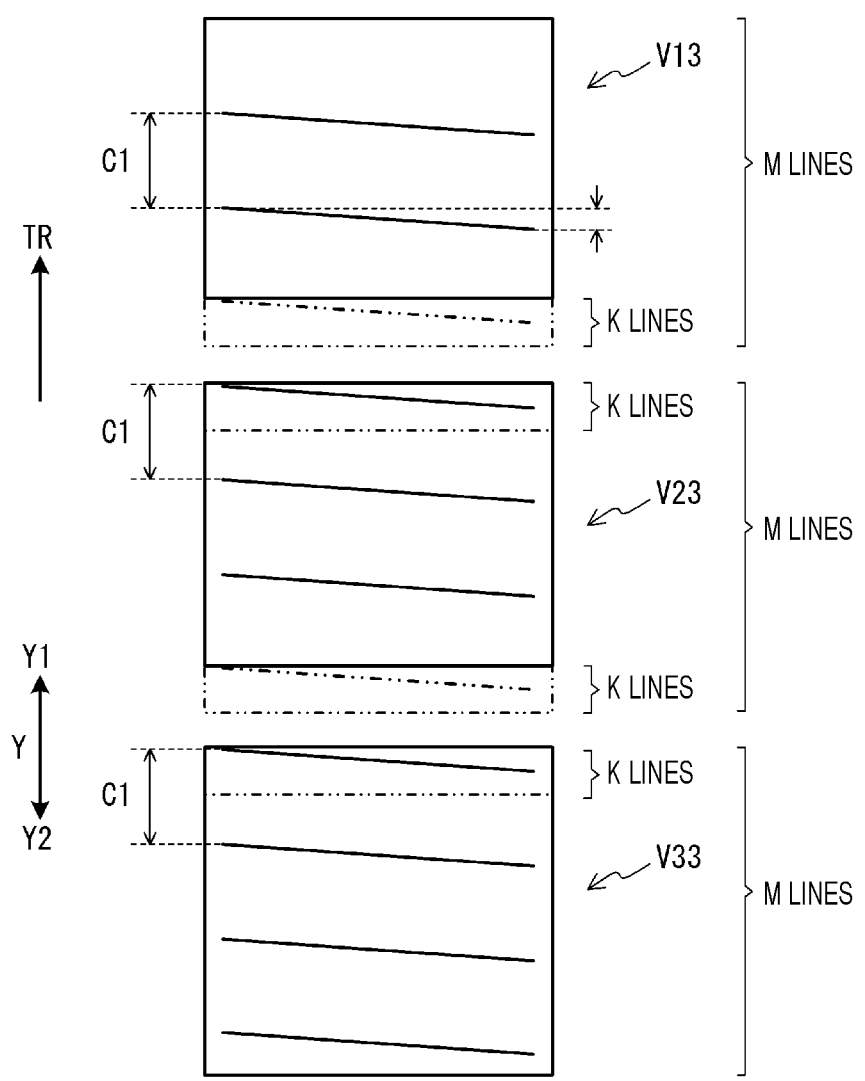
FIG. 10 is a diagram illustrating print images V13, V23, and V33.
Figure 11:
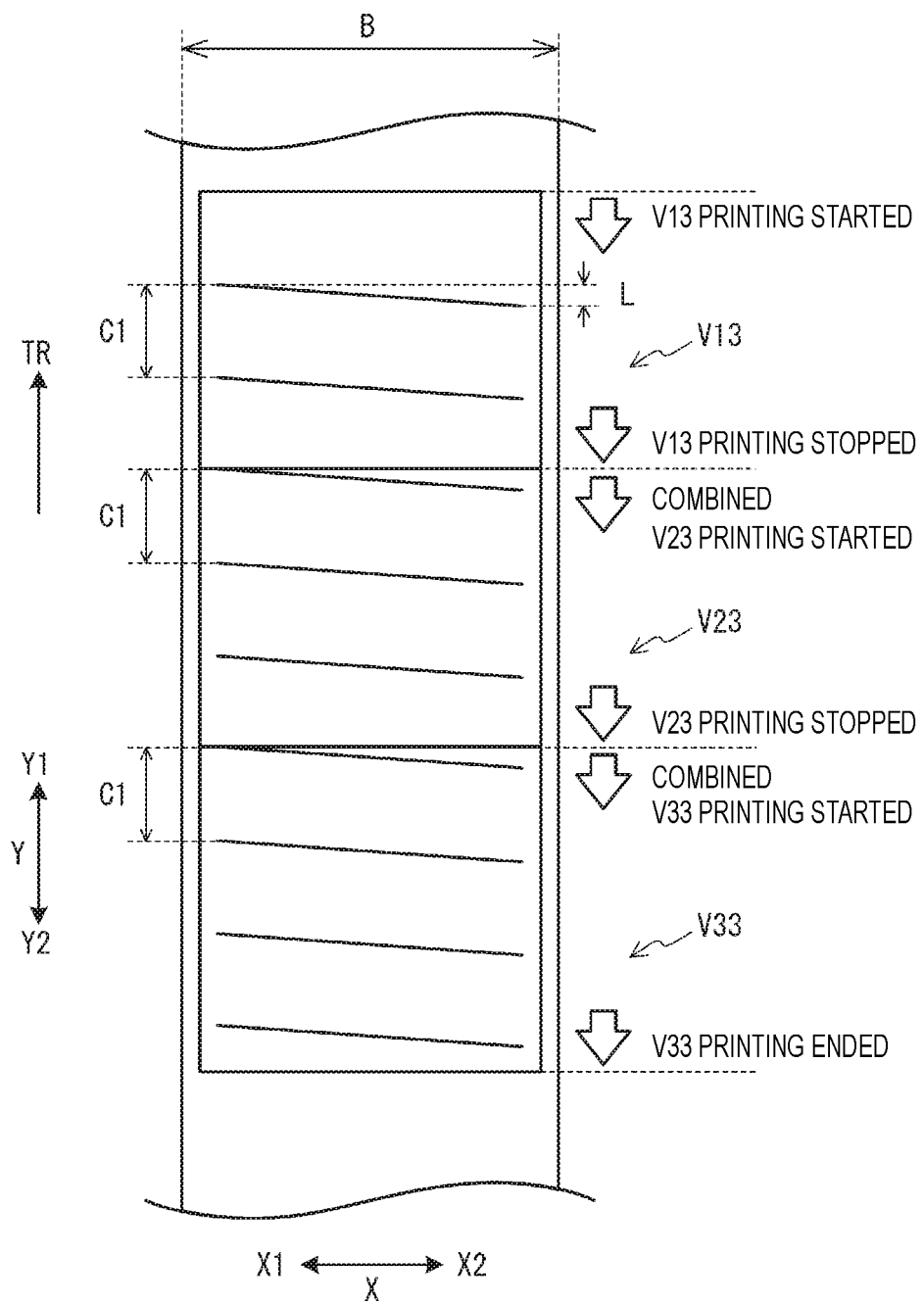
FIG. 11 is an explanatory diagram of a case where line printing is executed based on print images V13, V23, and V33.

As illustrated in FIGS. 10 and 11, the printing apparatus 1 combines some lines of the print image V12 with the print image V22 in order to reduce an increase in the interval between the two print images V12 and V22 or the two print images V22 and V32. The printing apparatus 1 combines some lines of the print image V22 with the print image V32.

More specifically, the printing apparatus 1 prints (M−K) lines, excluding the K M) lines on the upstream side Y2 in the sub-scanning direction, among the M lines of the print image V12 as the print image V13. The printing apparatus 1 combines the K lines of the unprinted print image V12 and the K lines of the print image V22 on the downstream side Y1 in the sub-scanning direction. When combining, the printing apparatus 1 combines the K-th lines of the print image V12 from the upstream side Y2 in the sub-scanning direction and the first lines of the print image V22 from the downstream side Y1 in the sub-scanning direction. The printing apparatus 1 combines the (K−1)-th lines of the print image V12 from the upstream side Y2 in the sub-scanning direction and the second lines of the print image V22 from the downstream side Y1 in the sub-scanning direction. The printing apparatus 1 sequentially combines the K lines of the print image V12 and the K lines of the print image V22.

The printing apparatus 1 prints (M−K) lines, excluding the K lines on the upstream side Y2 in the sub-scanning direction, among the M lines after the completion of the combination as the print image V23. Similarly, the printing apparatus 1 combines the K lines of the unprinted print image V22 and the K lines of the print image V32 on the downstream side Y1 in the sub-scanning direction. The printing apparatus 1 prints the M lines after the completion of combining as the print image V33.

In the printed print medium T, the interval between the ruled lines of the print image V13 on the upstream side Y2 in the sub-scanning direction and the ruled lines of the print image V23 on the downstream side Y1 in the sub-scanning direction is the length C1. On the printed print medium T, the interval between the ruled lines of the print image V23 on the upstream side Y2 in the sub-scanning direction and the ruled lines of the print image V33 on the downstream side Y1 in the sub-scanning direction is the length C1. A combination of the print images V13, V23, and V33 is the same image as the case where the print image V2 is printed.

In addition, in some cases, as illustrated in FIGS. 12A and 12B, the printing apparatus 1 may print image V4 by thinning out the lines of the input image U1 at predetermined intervals from the downstream side Y1 in the sub-scanning direction in order to reduce the length of the print image in the sub-scanning direction Y. In FIG. 12A, the lines to be thinned out from the input image U1 are schematically indicated by diagonal hatching. Hereinafter, the thinning out the lines of the input image by the printing apparatus 1 from the downstream side Y1 in the sub-scanning direction at the predetermined intervals is referred to as "performing a thinning process". In this embodiment, the thinning process thins out the lines from the input image U1 at the interval of 1 out of 20 lines from the downstream side Y1 in the sub-scanning direction. FIG. 12A illustrates the input image U1 before the thinning process is performed. FIG. 12B illustrates the print image V4 obtained by thinning out the input image U1. A length A3 of the print image V4 in the sub-scanning direction Y is 95% of the length A1 of the input image U1 in the sub-scanning direction Y.

Figure 13A:
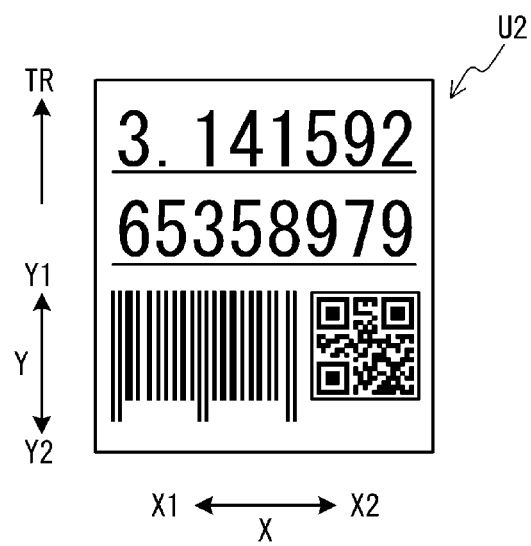
FIGS. 13A and 13B are diagrams illustrating input image U2 and divided images U3 and U4.
Figure 13B:
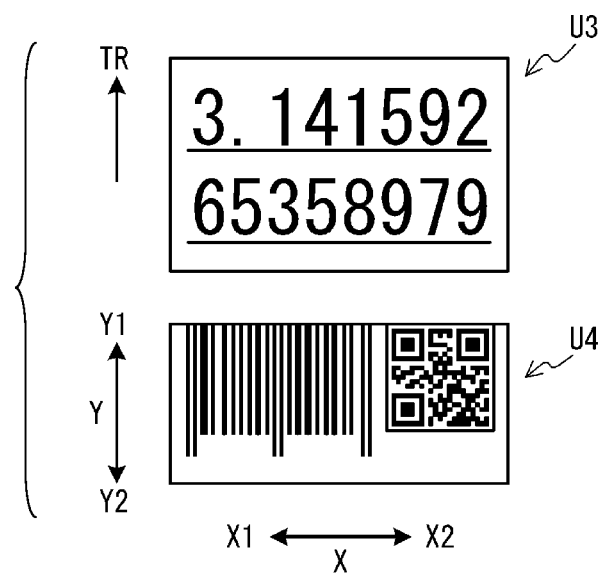

In some cases, the printing apparatus 1 may perform the thinning process by dividing the input image U2 illustrated in FIG. 13A into the divided images U3 and U4 illustrated in FIG. 13B. Before lines are thinned out from the input image U2 by the thinning process, the divided images U3 and U4 match the input image U2 when the divided images U3 and U4 are arranged in this order from the downstream side Y1 in the sub-scanning direction.

The input image U2 is configured with numerals, symbols, and ruled lines on the downstream side Y1 in the sub-scanning direction and barcodes and QR codes (registered trademarks) on the upstream side Y2 in the sub-scanning direction. The divided image U3 contains the numerals, the symbols, and the ruled lines in the input image U2. The divided image U4 contains the barcodes and the QR codes in the input image U2.

When the thinning process is performed on the divided image U4, there is the possibility that the bar code and QR code cannot be read in the print image on which the line printing is performed due to the thinning out of the lines. A characteristic portion such as a bar code or a QR code to which the thinning process is not desirably applied is referred to as a feature portion. The feature portion is specified, for example, by information or pattern matching at the time of inputting.

When the divided image to be printed next to one divided image in the plurality of divided images contains the feature portion and the thinning process is performed, the printing apparatus 1 combines the dots composing the lines of the divided image to be printed next and the dots composing the lines of one divided image on the upstream side Y2 in the sub-scanning direction.

Figure 14A:
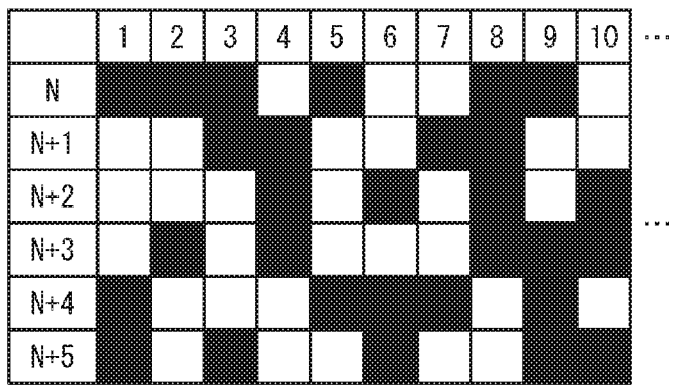
FIGS. 14A to 14C are explanatory diagrams of a case where feature portions are thinned out by the thinning process.
Figure 14B:
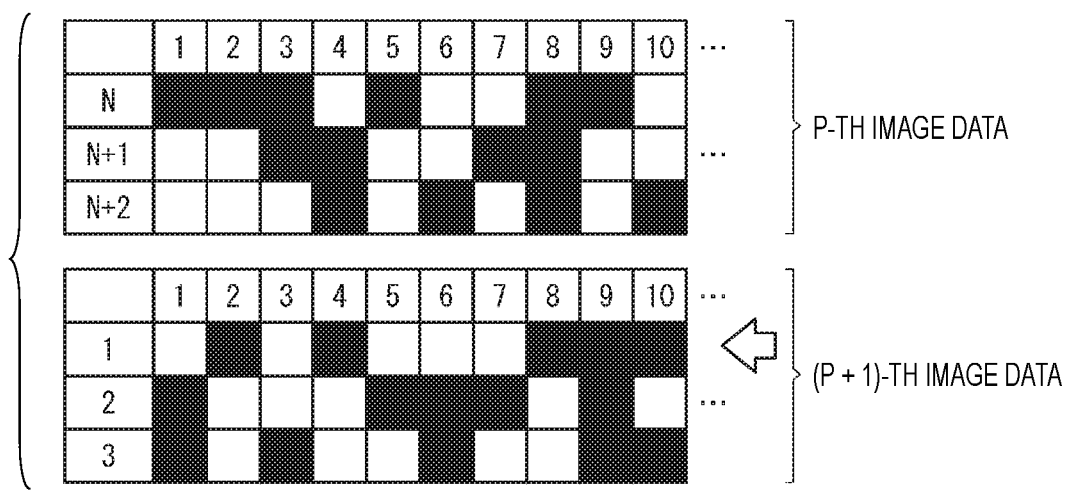

A method of combining the plurality of lines when the divided image contains the feature portion will be described with reference to FIGS. 14A to 14C. The image data of the input image before the division illustrated in FIG. 14A contains the lines with line numbers N to (N+5). The image data illustrated in FIG. 14B is image data of the divided images obtained by dividing the input image. The image data of the P-th divided image contains the lines with line numbers N to (N+2). The image data of the (P+1)-th divided image contains the lines of the line numbers (N+3) to (N+5) in the input image before the division. In the image data of the (P+1)-th divided image, the line number is moved down by (N+2). The line with line number (N+3) in the input image before the division becomes the line with line number 1 in the (P+1)-th divided image. The line with line number (N+4) in the input image before the division becomes the line with line number 2 in the (P+1)-th divided image. It is assumed that the (P+1)-th divided image contains the feature portion.

When printing based on the image data of the P-th divided image, the printing apparatus 1 refers to the image data of the (P+1)-th divided image. By executing the thinning process, the line with line number 1 in the image data of the (P+1)-th divided image having the feature portion is thinned out. The printing apparatus 1 combines the line with line number (N+2) in the P-th image data and the line with line number 1 in the (P+1)-th image data.

Figure 14C:
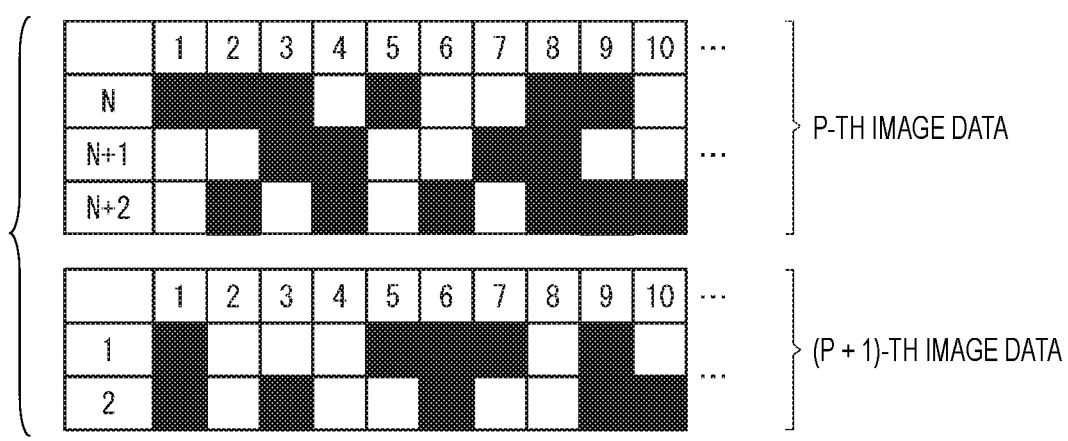

As illustrated in FIG. 14C, the line with line number (N+2) in the P-th image data after the combining contains the dots composing the lines with line number (N+2) in the P-th image data before the combining and the dots composing the lines with line number 1 in the (P+1)-th image data before the combining. After the thinning process, the line number of the (P+1)-th image data is moved down by 1. In the (P+1)-th image data, the line with line number 3 before the thinning process is performed becomes the line with line number 2. The line with line number 2 before the thinning process is performed becomes the line with line number 1.

The process executed by the CPU 7 of the printing apparatus 1 will be described with reference to FIGS. 15 to 20. The CPU 7 executes a setting process, a first generation printing process, and a second generation printing process described later. The setting process is a process of setting as to whether or not to execute any one of the shifting process and the thinning process in the first generation printing process and the second generation printing process before the execution of the first generation printing process and the second generation printing process. The first generation printing process is a process of generating the print data based on the input image and performing the printing operation.

The user inputs an instruction to start the setting process via the input device 3. When detecting the instruction to start the setting process, the CPU 7 reads out a program for executing the setting process from the storage device 9 to the RAM 8. The CPU 7 executes the setting process having the following steps according to the instructions contained in the read program. Various data obtained in the course of the setting process are stored in the storage device 9 as appropriate.

The RAM 8 stores combining variables as common variables used in the setting process, the first generation printing process, and the second generation printing process described later. The combining variable stores 1 when it is set to perform the shifting process, stores 2 when it is set to perform the thinning process, and stores 0 when it is set so as not to perform any one of the shifting process and the thinning process. In the first generation printing process and the second generation printing process, processing is performed based on the value of the combining variable stored in the setting process.

Figure 15:
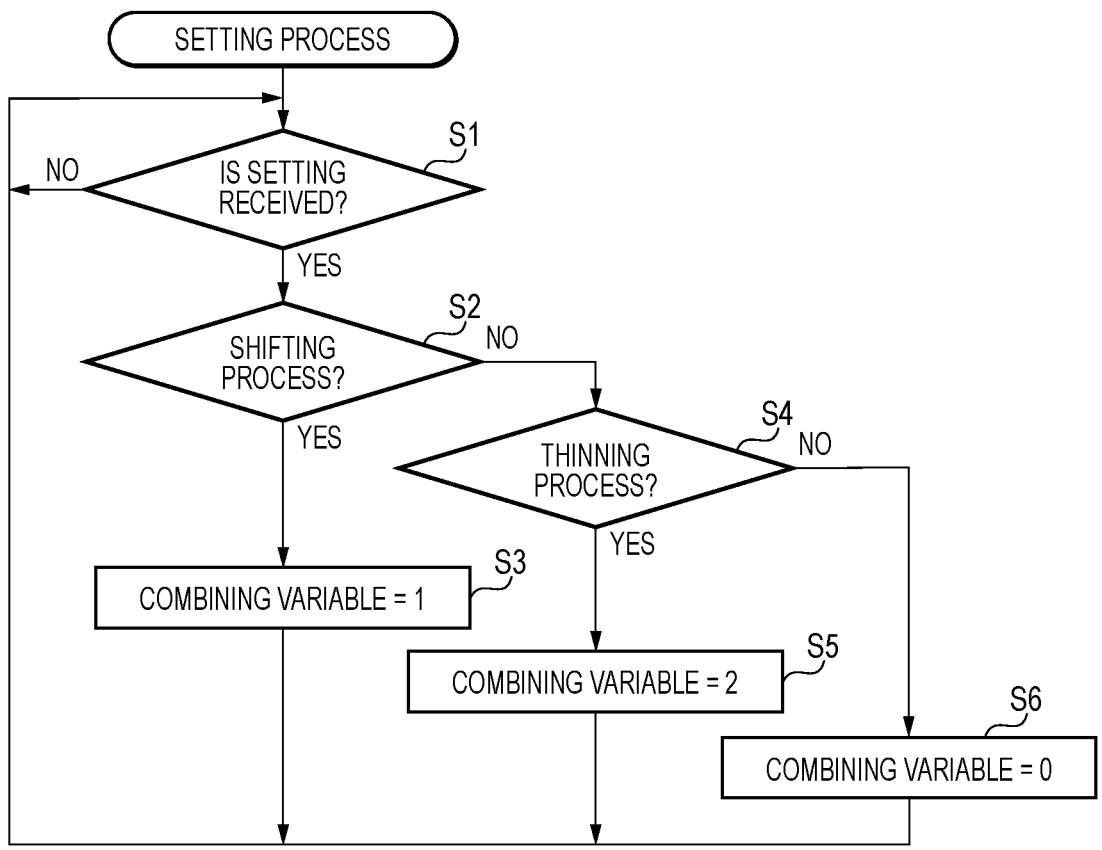
FIG. 15 is a flowchart of a setting process.

As illustrated in FIG. 15, when starting the setting process, the CPU 7 determines whether or not to receive the signal of the instruction to set the shifting process and thinning process (S1). The user inputs any one of the instruction to set the execution of the shifting process, the instruction to set the execution of the thinning process, and the instruction to set so as not to execute both the shifting process and the thinning process via the input device 3. When not receiving the signal of the instruction to set the shifting process and the thinning process (S1: NO), the CPU 7 returns the process to the determination of S1 and repeats the determination of S1 until the signal of the instruction to set the shifting process and the thinning process is received.

When receiving the signal of the instruction to set the shifting process and the thinning process (S1: YES), the CPU 7 determines whether or not the received instruction is the instruction to set the execution of the shifting process (S2). When the received instruction is the instruction to set the execution of the shifting process (S2: YES), the CPU 7 sets the value of the combining variable to 1 and stores the value in the RAM 8 (S3). The CPU 7 returns the process to the determination of S1.

When the received instruction is not the instruction to set the execution of the shifting process (S2: NO), the CPU 7 determines whether or not the received instruction is the instruction to set the execution of the thinning process (S4). When the received instruction is the instruction to set the execution of the thinning process (S4: YES), the CPU 7 sets the value of the combining variable to 2 and stores the value in the RAM 8 (S5). The CPU 7 returns the process to the determination of S1.

When the received instruction is not the instruction to set the execution of the thinning process (S4: NO), the CPU 7 sets the value of the combining variable to 0 and stores the value in the RAM 8 (S6). The CPU 7 returns the process to the determination of S1.

Figure 17:
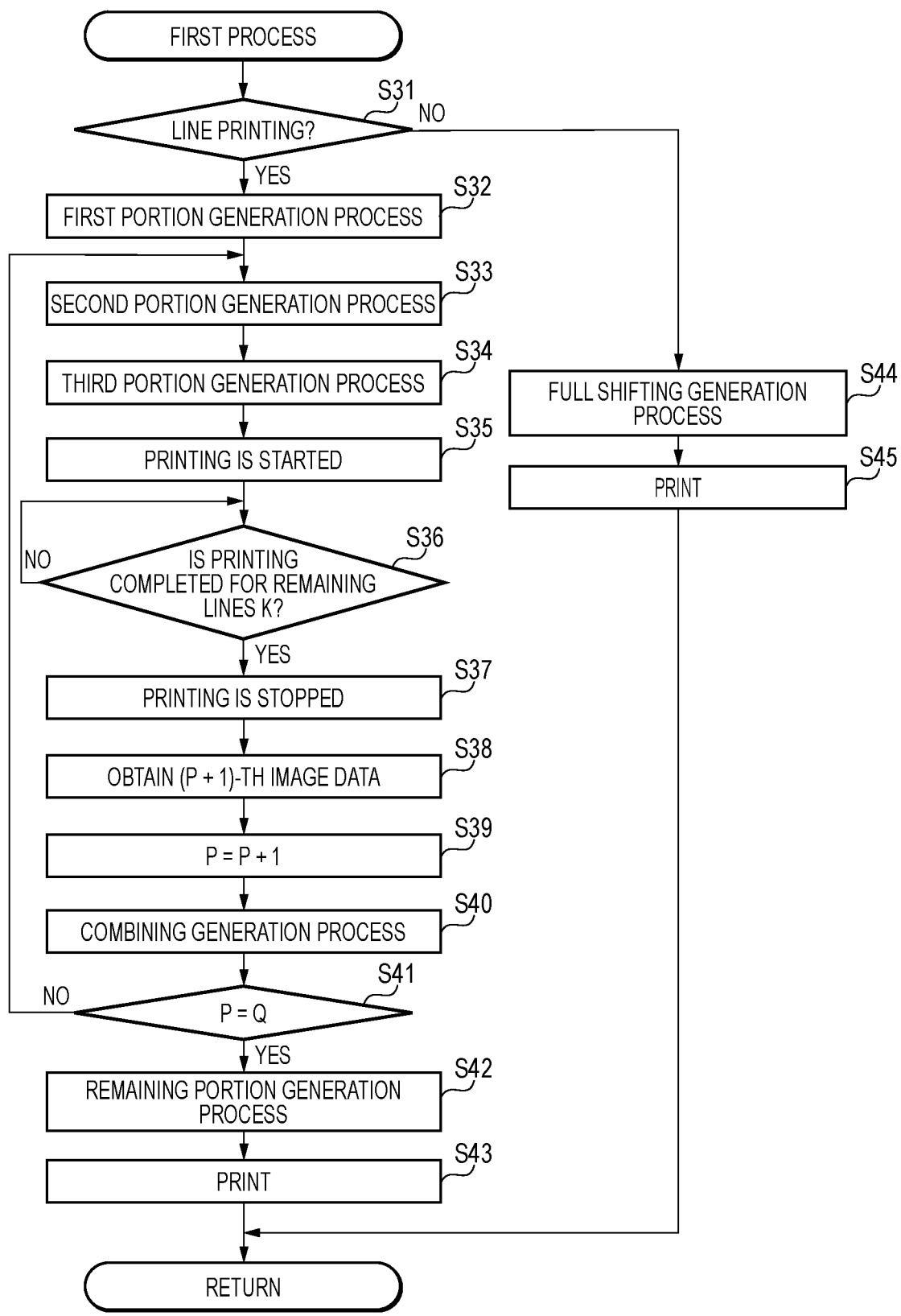
FIG. 17 is a flowchart of a first process executed in the first generation printing process.
Figure 18:
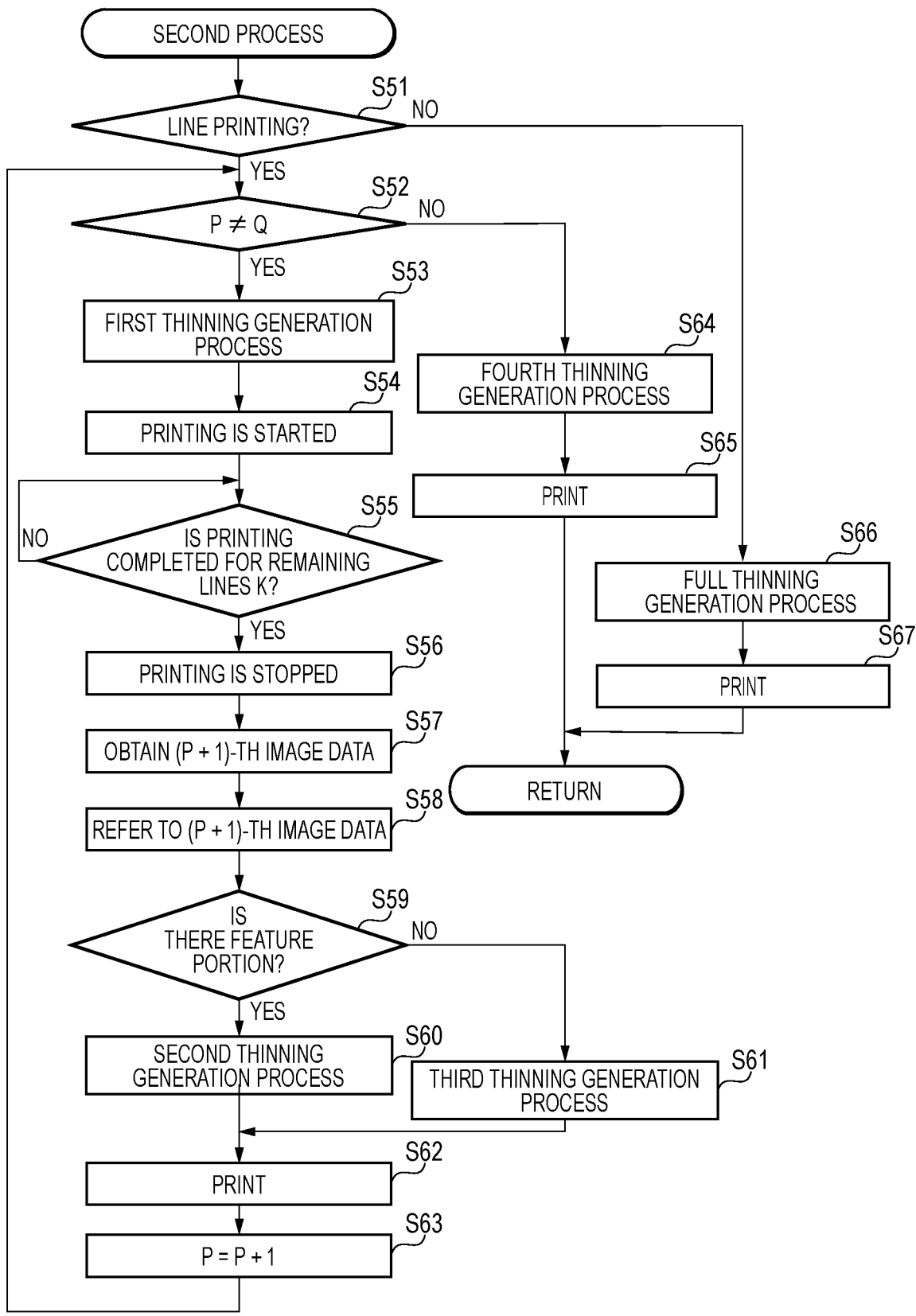
FIG. 18 is a flowchart of a second process executed in the first generation printing process.

The first generation printing process will be described with reference to FIGS. 16 to 18. The user inputs the instruction to start the first generation printing process via the input device 3. When detecting the instruction to start the first generation printing process, the CPU 7 reads out the program for executing the first generation printing process from the storage device 9 to the RAM 8.

The RAM 8 stores the division variable and the order variable P as variables used in the first generation printing process. The division variable stores 1 when the line printing is performed based on the divided image and stores 0 when the line printing is not performed. The order variable P indicates what number the divided image is from the downstream side Y1 in the sub-scanning direction with respect to the input image. The minimum value of the order variable P is 1, and the maximum value is Q (Q=3 in the example illustrated in FIG. 4) of the division number of the input image. It is noted that, in this embodiment, the number of lines in each divided image is M.

Figure 16:
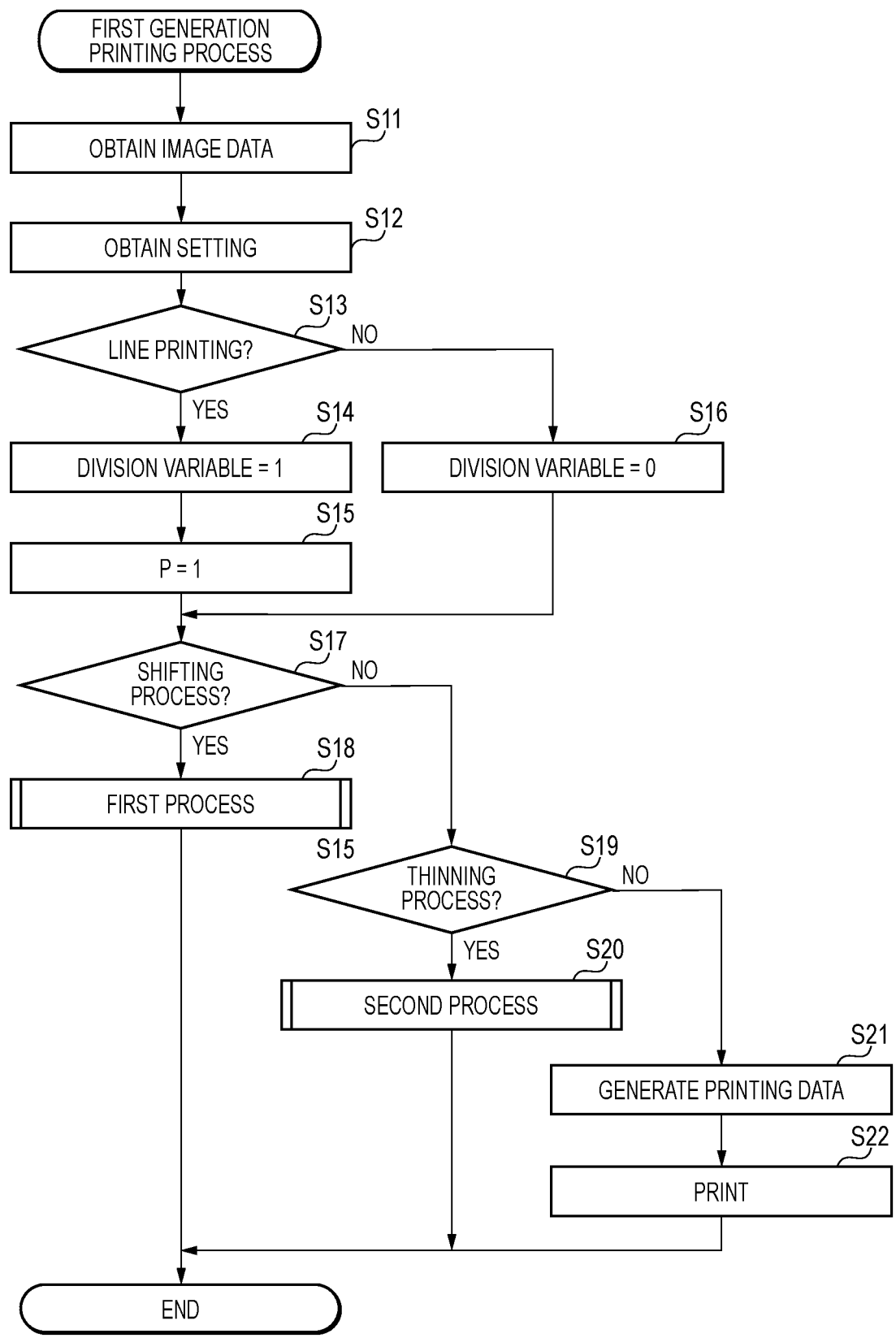
FIG. 16 is a flowchart of a first generation printing process.

As illustrated in FIG. 16, when starting the first generation printing process, the CPU 7 obtains the image data indicating the input image (S11). The image data is data indicating the input image or the divided image. When the image data is the data indicating the divided image, the image data includes data indicating the divided image, data indicating the maximum value Q of the order variable P of the input image, and data indicating what number the divided image is from the downstream side Y1 in the sub-scanning direction with respect to the input image. When the CPU 7 obtains the image data indicating the divided image in S11, the image data is the data indicating the divided image to be printed firstly when the line printing is to be executed (the divided image on the most downstream side Y1 in the sub-scanning direction on the print medium T).

The CPU 7 obtains, for example, the image data generated by the external device 99 from the external device 99 via the communication device 4. The CPU 7 may obtain the image data stored in the storage device 9, or may obtain the image data input by the input device 3 according to the user operation. The CPU 7 transitions the process to S12.

The CPU 7 obtains the setting as to whether or not to execute any one of the shifting process and the thinning process set in the setting process (S12). The CPU 7 obtains the value of the combining variable stored in the RAM 8 in S12. The CPU 7 transitions the process to S13.

The CPU 7 determines whether or not to execute the line printing (S13). The CPU 7 performs the determination in S13 based on the image data obtained in S11. When the image data contains data indicating that the image data is the divided image and the line printing is to be executed (S13: YES), the CPU 7 sets the value of the division variable to 1 and stores the value in the RAM 8 (S14). The CPU 7 sets the value of the order variable P to 1 and stores the value in the RAM 8 (S15). The CPU 7 transitions the process to S17.

When the image data does not contain data indicating that the image data is the divided image and the line printing is not to be executed (S13: NO), the CPU 7 sets the value of the division variable to 0 and stores the value in the RAM 8 (S16). The CPU 7 transitions the process to S17.

The CPU 7 determines whether or not to execute the shifting process based on the value of the combining variable obtained in S12 (S17). When the value of the combining variable is 1 and the shifting process is to be executed (S17: YES), the CPU 7 executes the first process (S18) and ends the first generation printing process. The first process is a process of generating the print data and executing the printing operation when executing the shifting process.

The first process (S18, refer to FIG. 16) executed in the first generation printing process will be described with reference to FIG. 17. The CPU 7 determines whether or not to execute the line printing based on the value of the division variable (S31).

When the value of the division variable is 1 and the line printing is to be executed (S31: YES), the CPU 7 performs a first portion generation process (S32). The first portion generation process is a process of performing the shifting process on the first portion obtained by further dividing the divided image obtained in S11 (refer to FIG. 16) into three portions and generating the print data for forming the dots after the shifting process. The first portion of the divided image is configured with the lines of line numbers 1 to K of the divided image. The second portion of the divided image is configured with the lines from line numbers K+1 to M−K of the divided image. The third portion of the divided image is configured with the lines from line numbers M−K+1 to M of the divided image. The CPU 7 transitions the process to S33.

The CPU 7 performs a second portion generation process (S33). The second portion generation process is a process of performing the shifting process on the second portion of the divided image and generating the print data for forming the dots after the shifting process. The CPU 7 performs a third portion generation process (S34). The third portion generation process is a process of performing the shifting process on the third portion of the divided image and generating the print data for forming the dots after the shifting process. The CPU 7 transitions the process to S35.

The CPU 7 starts the printing operation (S35). The CPU 7 performs the printing operation based on the print data generated in the first portion generation process and the second portion generation process, and prints the print image (print image V13 in FIG. 11) on the print medium T. The CPU 7 controls the conveyance device 5 and the print head 6 to sequentially print the print image from the line number 1 of the print image.

The CPU 7 sequentially performs printing the divided images from line number 1 and determines whether or not the printing is completed until the number of unprinted lines in the divided image reaches K (S36). When the printing is not completed until the number of unprinted lines reaches K (S36: NO), the CPU 7 returns the process to the determination of S36, and repeats the determination of S36 until the number of unprinted lines reaches K. When the printing is completed until the number of unprinted lines reaches K (S36: YES), the CPU 7 stops the conveyance device 5 and the print head 6 to stop the printing operation (S37). When the printing operation is stopped, the printing of the line number 1 to the line number M−K of the divided image is completed. The CPU 7 transitions the process to S38.

The CPU 7 obtains the (P+1)-th image data, which is the next image data to the P-th image data that is the basis of the printing operation performed from S35 to S37 (S38). The CPU 7 adds 1 to the value of the order variable P (S39). The CPU 7 transitions the process to S40.

The CPU 7 executes the combining generation process (S40). In the combining generation process, the CPU 7 performs the shifting process on the first portion of the divided image in the (P+1)-th image data and generates the print data for forming the dots after the shifting process. The CPU 7 combines the print data based on the third portion of the P-th image data that is not printed in S35 to S37 and the print data based on the first portion of the (P+1)-th image data. The CPU 7 transitions the process to S41.

The CPU 7 determines whether or not the value of the order variable P is equal to the maximum value Q (S41). When the value of the order variable P is smaller than the maximum value Q (S41: NO), after the printing based on the print data generated from the P-th divided image, the CPU 7 performs the printing based on the print data generated from the (P+1)-th divided image to return the process to S33. The CPU 7 performs the printing operation based on the first portion of print data combined in S40 and the second portion of print data generated in S33 (S35 to S37).

When the value of the order variable P is equal to the maximum value Q (S41: YES), the CPU 7 performs a remaining portion generation process (S42). The remaining portion generation process is a process of performing the shifting process on the second and third portions of the divided image to be printed last (order variable P=Q) and generating the print data for forming the dots after the shifting process.

The CPU 7 performs the printing operation based on the print data generated in S40 and S42 (S43). The print image (print image V33 in FIG. 11) is printed on the print medium T. The CPU 7 returns the process to the first generation printing process.

On the other hand, when the value of the division variable is 0 and the line printing is not to be executed (S31: NO), the CPU 7 performs a full shifting generation process (S44). The full shifting generation process is a process of performing the shifting process on the full input images and generating the print data for forming the dots after the shifting process. The CPU 7 performs the printing operation based on the print data generated in S44 (S45). The CPU 7 returns the process to the first generation printing process.

As illustrated in FIG. 16, when the value of the combining variable is other than 1 and the shifting process is not to be executed (S17: NO), the CPU 7 determines whether or not to execute the thinning process based on the value of the combining variable obtained in S12 (S19).

When the value of the combining variable is 2 and the thinning process is to be executed (S19: YES), the CPU 7 executes the second process (S20) and ends the first generation printing process.

The second process (S20, refer to FIG. 16) executed in the first generation printing process will be described with reference to FIG. 18. The CPU 7 determines whether or not to execute the line printing based on the value of the division variable (S51).

When the value of the division variable is 1 and the line printing is to be executed (S51: YES), the CPU 7 determines whether or not the value of the order variable P is different from the maximum value Q (S52). When the value of the order variable P is different from the maximum value Q (S52: YES), after the printing based on the print data generated from the P-th divided image, the CPU 7 performs the printing based on the print data generated from the (P+1)-th divided image to execute a first thinning generation process (S53). The first thinning generation process is a process of performing the thinning process on the first portion and the second portion of the divided image in the P-th image data and generating the print data for printing the lines after the thinning process. In the first thinning generation process, after the thinning process is executed, the line number is re-assigned to the P-th image data.

The CPU 7 starts the printing operation (S55). The CPU 7 performs the printing operation based on the print data generated in the first thinning generation process and prints the print image on the print medium T. The CPU 7 controls the conveyance device 5 and the print head 6 to sequentially perform the printing from the line number 1 of the print image.

The CPU 7 sequentially performs the printing from line number 1 of the divided image and determines whether or not the printing is completed until the number of unprinted lines in the divided image reaches K (S55). When the printing is not completed until the number of unprinted lines reaches K (S55: NO), the CPU 7 returns the process to the determination of S55 and repeats the determination of S55 until the number of unprinted lines reaches K. When the printing is completed until the number of unprinted lines reaches K (S55: YES), the CPU 7 stops the conveyance device 5 and the print head 6 to stop the printing operation (S56). The CPU 7 transitions the process to S57.

The CPU 7 obtains the (P+1)-th image data which is the next image data for the P-th image data (S57). The CPU 7 refers to the (P+1)-th image data obtained in S53 (S58). In S54, the CPU 7 checks whether or not the (P+1)-th image data contains the feature portion by referring to the information at the time of inputting the divided image or by performing the pattern matching.

The CPU 7 determines whether or not the (P+1)-th image data referred to in S54 contains the feature portion (S59). When the (P+1)-th image data contains the feature portion (S59: YES), the CPU 7 executes a second thinning generation process (S60). The second thinning generation process is a process of performing the thinning process on the third portion of the divided image in the P-th image data and combining the lines of the third portion of the divided image in the P-th image data and the lines containing the feature portion in the first portion of the divided image in the (P+1)-th image data. The print data corresponding to the third portion of the P-th divided image is generated by the second thinning generation process. The CPU 7 transitions the process to S62.

When the (P+1)-th image data does not contain the feature portion (S59: NO), the CPU 7 executes a third thinning generation process (S61). The third thinning generation process is a process of thinning out the third portion of the divided image in the P-th image data. The print data corresponding to the third portion of the P-th divided image is generated by the third thinning generation process. The CPU 7 transitions the process to S62.

The CPU 7 performs the printing operation based on the print data corresponding to the third portion of the P-th divided image generated in S60 and S61 (S62). The CPU 7 adds 1 to the value of the order variable P (S63) and returns the process to the determination of S52.

When the value of the order variable P is equal to the maximum value Q as the result of the addition in S63 (S52: NO), the CPU 7 executes a fourth thinning generation process (S64). The fourth thinning generation process is a process of thinning out the full divided images (order variable P=Q) to be printed last. The print data corresponding to the Q-th divided image is generated by the fourth thinning generation process. The CPU 7 performs the printing operation based on the print data generated in S64 (S65). The CPU 7 returns the process to the first generation printing process.

On the other hand, when the value of the division variable is 0 and the line printing is not to be executed (S51: NO), the CPU 7 performs a full thinning generation process (S66). The full thinning generation process is a process of thinning out the full input images. The print data corresponding to the input image is generated by the full thinning generation process. The CPU 7 performs the printing operation based on the print data generated in S66 (S67). The CPU 7 returns the process to the first generation printing process.

As illustrated in FIG. 16, when the value of the combining variable is 0 and any one of the shifting process and the thinning process is not to be executed (S19: NO), the CPU 7 generates the print data based on the input image or the divided image obtained in S11 (S21). The CPU 7 performs the printing operation based on the print data generated in S21 (S22). The CPU 7 ends the first generation printing process.

In some cases, when performing the printing on the print medium T, the printing apparatus 1 of the first embodiment may perform the printing based on the divided images obtained by dividing the input image in the sub-scanning direction Y. In addition, in some cases, the printing apparatus 1 may compose the plurality of lines into one line in the shifting process and the thinning process. The combined line includes the dots that compose each of the plurality of lines before the combining. The printing apparatus 1 obtains the image data of the divided images (S11, S38, and S57). The printing apparatus 1 generates the print data based on the image data of the divided images (S32 to S34, S40, S42, S53, S60, S61, and S64). The printing apparatus 1 executes the shifting process in S32 to S34, S40, and S42. The printing apparatus 1 performs the shifting process when generating the print data in S32 to S34, S40, and S42. The printing apparatus 1 combines the plurality of lines into one line in the shifting process. When generating the print data in S60, the printing apparatus 1 executes the thinning process and sets the plurality of lines into one line. After the printing based on the print data generated from the P-th divided image, the printing apparatus 1 determines whether or not to perform the printing based on the print data generated from the (P+1)-th divided image (S41 and S52). When performing the printing based on the print data generated from the (P+1)-th divided image, the printing apparatus 1 stops the printing operation before printing the full P-th divided images (S37 and S56). The printing apparatus 1 combines the K lines of the P-th divided image for which the printing operation is stopped on the upstream side Y2 in the sub-scanning direction and the K lines of the (P+1)-th divided image on the downstream side Y1 in the sub-scanning direction (S40 and S60). Accordingly, when performing the printing based on the print data corresponding to each of the plurality of divided images, the printing apparatus 1 of the first embodiment can reduce an increase in the interval between the print images printed based on each print data.

The printing apparatus 1 executes the shifting process when generating print data in S32 to S34, S40, and S42. Due to the shifting process, some of the dots composing the lines are shifted to the upstream side Y2 in the sub-scanning direction. Even in this case, the printing apparatus 1 can reduce an increase in the interval between the print images printed based on each print data.

The printing apparatus 1 refers to the (P+1)-th divided image and checks whether or not the (P+1)-th divided image contains the feature portion (S58). When generating print data in S60, the printing apparatus 1 performs the thinning process on the third portion of the P-th divided image and combines the lines of the third portion of the P-th divided image and the lines containing the feature portions in the first portion of the (P+1)-th divided image. The printing apparatus 1 refers to the (P+1)-th divided image and changes the dots composing the lines of the P-th divided image. Even in this case, the printing apparatus 1 can reduce an increase in the interval between the print images printed based on each print data.

The printing apparatus 1 of the first embodiment combines the lines of the P-th divided image and the lines of the (P+1)-th divided image when performing the line printing and performing the shifting process or the thinning process. Accordingly, the printing apparatus 1 of the first embodiment reduces the increase in the interval between the print images printed based on the print data corresponding to the plurality of divided images. On the other hand, the printing apparatus 1 of the second embodiment performs control so as not to perform both the line printing and the shifting process or the thinning process.

The printing apparatus 1 of the second embodiment is different from the printing apparatus 1 of the first embodiment in that the printing apparatus 1 of the second embodiment executes the second generation printing process instead of the first generation printing process. Hereinafter, configurations having the same functions as those of the printing apparatus 1 of the first embodiment will be denoted by the same reference numerals as those of the printing apparatus 1 of the first embodiment, and descriptions thereof will be omitted or simplified. Processes that are the same as the first generation printing process are denoted by the same reference numerals as the first generation printing process, and descriptions thereof are omitted or simplified.

The second generation printing process executed by the CPU 7 will be described with reference to FIGS. 19 and 20. The user inputs the instruction to start the second generation printing process via the input device 3. When the CPU 7 detects the instruction to start the second generation printing process, the CPU 7 reads out the program for executing the second generation printing process from the storage device 9 to the RAM 8.

Figure 19:
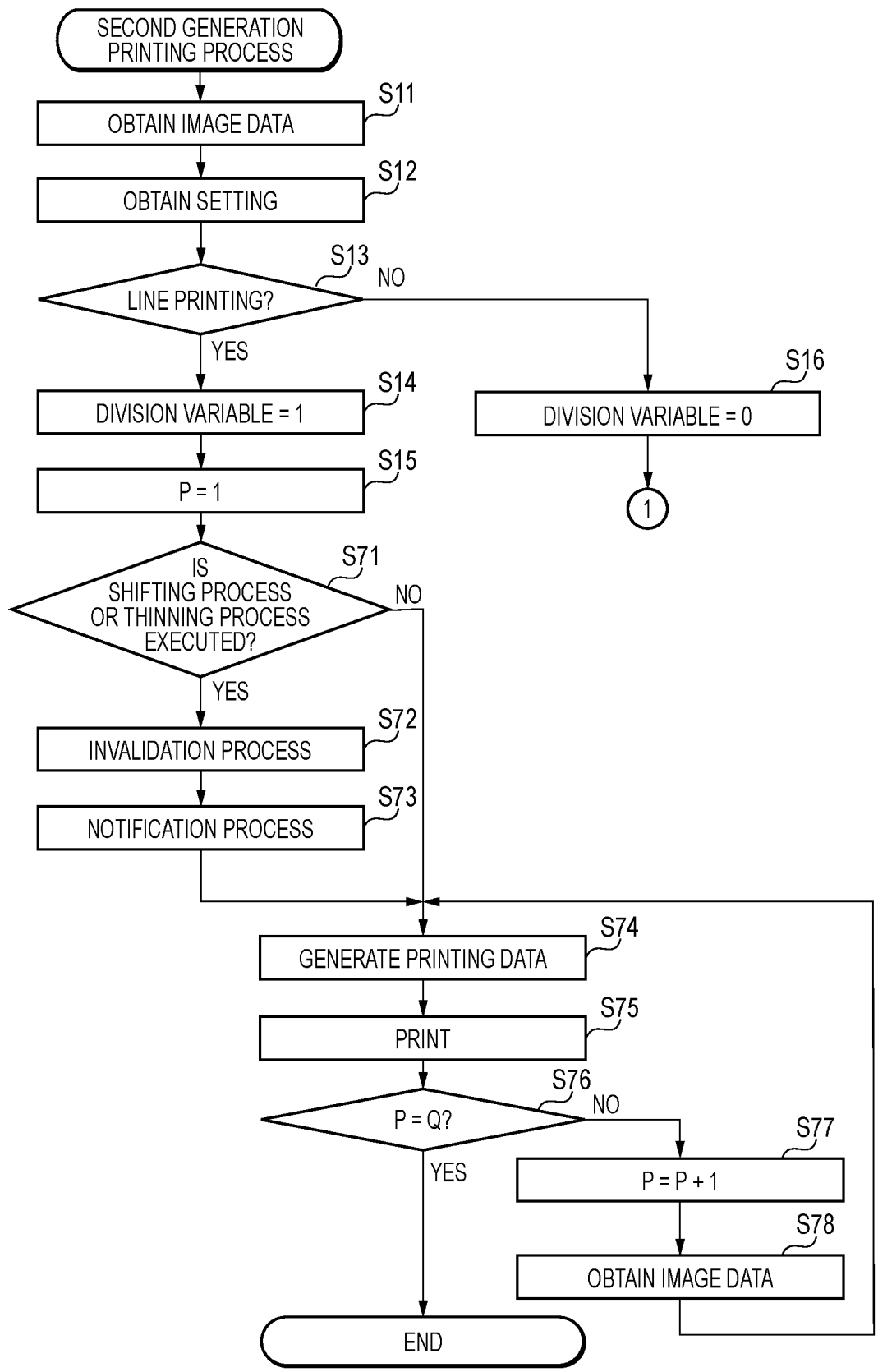
FIG. 19 is a flowchart of a second generation printing process.

As illustrated in FIG. 19, when the CPU 7 starts the second generation printing process, the CPU 7 obtains image data (S11). The CPU 7 obtains the value of the combining variable from the RAM 8, and by doing so, obtains the setting as to whether or not to execute any one of the shifting process and the thinning process set in the setting process (refer to FIG. 15) (S12).

The CPU 7 determines whether or not to execute the line printing based on the image data obtained in S11 (S13). When the image data contains data indicating that the image data is the divided image and the line printing is to be executed (S13: YES), the CPU 7 sets the value of the division variable to 1 and stores the value in the RAM 8 (S14). The CPU 7 sets the value of the order variable P to 1 and stores the value in the RAM 8 (S15). The CPU 7 transitions the process to S71.

The CPU 7 determines, in the setting process, whether or not the shifting process or the thinning process is set to be executed based on the value of the combining variable obtained in S12 (S71).

When the value of the combining variable is 1 or 2 and the shifting process or the thinning process is set to be executed (S71: YES), the CPU 7 executes an invalidation process (S72). The invalidation process is a process of invalidating the setting for executing the shifting process or the thinning process which is set in the setting process. The CPU 7 sets the value of the combining variable to 0 and stores the value in the RAM 8 in the invalidation process. The CPU 7 executes a notification process (S73). The CPU 7 transmits the instruction to the external device 99 via the communication device 4 in the notification process. The external device 99 executes the line printing in accordance with the instruction from the CPU 7 and allows the display 98 to display that the shifting process and the thinning process cannot be executed. The CPU 7 transitions the process to S74.

When the value of the combining variable is 0 and the shifting process or the thinning process is not set to be executed (S71: NO), the CPU 7 transitions the process to S74.

The CPU 7 generates the print data based on the obtained divided images (S74). The CPU 7 does not execute any one of the shifting process and the thinning process in S73. The CPU 7 performs the printing operation based on the print data generated in S73 (S75). The CPU 7 transitions the process to S75.

The CPU 7 determines whether or not the order variable P is equal to the maximum value Q (S76). When the order variable P is smaller than the maximum value Q (S76: NO), the CPU 7 adds 1 to the value of the order variable P (S77). The CPU 7 obtains the image data of the divided image of the order variable P after the addition in S76 (S78). The CPU 7 returns the process to S74. The CPU 7 repeats the processes of S74 to S78 until the printing of all the divided images is completed. When the order variable P is equal to the maximum value Q (S76: YES), the CPU 7 concludes that printing of all divided images is completed and ends the second generation printing process.

When the image data does not contain data indicating the divided image and the line printing is not to be executed (S13: NO), the CPU 7 sets the value of the division variable to 0 and stores the value in the RAM 8 (S16). The CPU 7 transitions the process to S17 (refer to FIG. 20).

Figure 20:
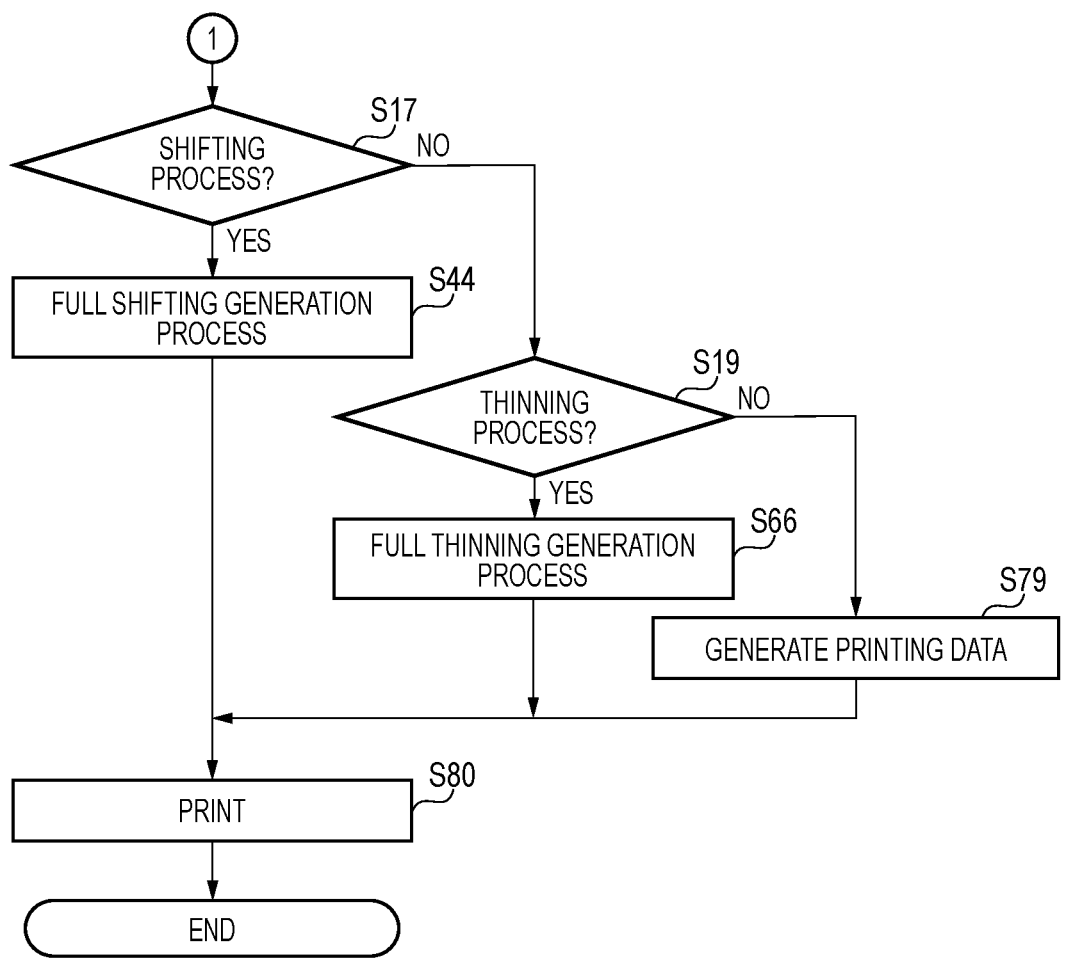
FIG. 20 is a flowchart of the second generation printing process following FIG. 19.

As illustrated in FIG. 20, the CPU 7 determines whether or not to execute the shifting process based on the value of the combining variable obtained in S12 (S17). When the value of the combined variable is 1 and the shifting process is to be executed (S17: YES), the CPU 7 executes the full shifting generation process (S44) and transitions the process to S79.

When the value of the combining variable is other than 1 and the shifting process is not to be executed (S17: NO), the CPU 7 determines whether or not to execute the thinning process based on the value of the combining variable obtained in S12 (S19). When the value of the combining variable is 2 and the thinning process is to be executed (S19: YES), the CPU 7 executes the full thinning generation process (S66) and transitions the process to S79.

When the value of the combining variable is 0 and any one of the shifting process and the thinning process is not to be executed (S19: NO), the CPU 7 generates the print data based on the input image obtained in S11 (S79). The CPU 7 performs the printing operation based on the print data generated in S44, S66, and S78 (S80). The CPU 7 ends the second generation printing process.

The printing apparatus 1 of the second embodiment determines whether the image data indicates the print image itself or the divided image based on the image data obtained in S1*l* (S13). When the image data indicates the divided image and the line printing is to be executed, the printing apparatus 1 generates the print data based on the obtained divided image (S74). The printing apparatus 1 does not perform any one of the shifting process and the thinning process in S73. The CPU 7 performs the printing operation based on the print data generated in S73 (S75). When the image data indicates the input image itself and the line printing is not to be performed, the printing apparatus 1 performs the full shifting generation process (S44) and the full thinning generation process (S66) to generate the print data. The printing apparatus 1 performs the shifting process on the full input images in the full shifting generation process. The printing apparatus 1 combines the plurality of lines into one line in the shifting process. The printing apparatus 1 performs the thinning process on the full input images in the full thinning generation process. The printing apparatus 1 performs the printing based on the print data (S74 and S80). Accordingly, when performing the printing based on the plurality of print data, the printing apparatus 1 of the second embodiment can suppress an increase in the interval between the print images to be printed based on each of the print data by combining two or more lines of the divided image.

In the case of obtaining the image data indicating the input image, when generating the print data in the full shifting generation process (S44), the printing apparatus 1 executes the shifting process. Due to the shifting process, some of the dots composing the lines are shifted to the upstream side Y2 in the sub-scanning direction. When obtaining the image data indicating the divided image, the printing apparatus 1 does not execute the shifting process. Accordingly, the printing apparatus 1 can reduce an increase in the interval between the print images to be printed based on each print data by performing the shifting process on the divided images and combining two or more lines.

In the case where the image data indicating the input image is obtained, when generating the print data in the full thinning generation process (S66), the printing apparatus 1 executes the thinning process. Due to the thinning process, some of the lines of the input image are thinned out. When the image data indicating the divided images are obtained, the printing apparatus 1 does not perform the thinning process. In some cases, when thinning out the lines of the image data indicating the plurality of divided images, the printing apparatus 1 may refer to the image data indicating the divided image to be printed next to one divided image and change the lines of the print data for one divided image. The printing apparatus 1 can reduce an increase in the interval between the print images printed based on each print data by performing the thinning process on the divided images and combining the lines of the print data of one divided image.

In the setting process, the printing apparatus 1 receives the instruction signals for setting the shifting process and the thinning process via the input device 3 (S1). When the image data indicates the divided image and the line printing is to be performed, the printing apparatus 1 performs the invalidation process (S72). In the invalidation process, the printing apparatus 1 invalidates the setting of executing the shifting process or the thinning process set in the setting process. In the case where the image data indicates the divided image and the line printing is to be executed, even when receiving the signal of the instruction to set the shifting process and the thinning process in the setting process, the printing apparatus 1 invalidates the received settings. Accordingly, the printing apparatus 1 can simplify the processes.

When the image data indicates the divided image and the line printing is to be performed, the printing apparatus 1 performs the notification process (S73). The CPU 7 transmits the instruction to the external device 99 via the communication device 4 in the notification process. The external device 99 executes the line printing in accordance with the instruction from the CPU 7, and thus, allows the display 98 to display that the shifting process and the thinning process cannot be executed. The user can understand that the shifting process and the thinning process cannot be executed due to the notification by the notification process.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The printing apparatus 1 may be a printing apparatus having a line thermal head for thermally transferring an ink ribbon as the print head 6. The printing apparatus 1 may be an inkjet printer including a plurality of piezoelectric elements as the plurality of elements 61 and a line inkjet head as the print head 6. The printing apparatus 1 may be an electrophotographic printer that includes a plurality of LEDs (light emitting diodes) as the plurality of elements 61 and a line LED head as the print head 6.

The print medium T is not limited to a specific medium. The print medium T may be, for example, a sheet of cut paper. The print medium T may be a lamination tape in which release paper is laminated on one side of the double-sided adhesive tape and a tape is laminated on the other side of the double-sided adhesive tape. The print medium T may be fanfold paper that is folded along perforations engraved on the paper to be cut into the paper.

Various changes may be added to the shifting process. The direction in which the print image is oblique with respect to the input image by shifting the dots by the shifting process is not limited to the above embodiment. For example, the print image may have a shape that is oblique toward the other side X2 in the main scanning direction and the downstream side Y1 in the sub-scanning direction in comparison with the input image. The print image may, for example, have a V-shaped oblique shape in comparison with the input image. In the shifting process, the dots composing the input image may be shifted not only in the sub-scanning direction Y but also in the main scanning direction X. The print image may, for example, have a clockwise rotated shape in comparison with the input image.

The printing apparatus 1 may change the generated print data so that some dots are not formed in the printed portion. Accordingly, the printing apparatus 1 can reduce the peak number of the plurality of elements 61 to be energized.

The printing apparatus 1 may receive the signals of the instruction for setting the shifting process and the thinning process after obtaining the image data in the first generation printing process or the second generation printing process. At this time, when the obtained image data indicates the divided images and the line printing is determined to be executed, the printing apparatus 1 may perform a reception prohibition process which prohibits receiving the signals of the instruction for setting the shifting process and the thinning process after the determination. Accordingly, the printing apparatus 1 can simplify the processes.

The setting process, the first generation printing process, and the second generation printing process executed by the CPU 7 may be executed by a dedicated or general-purpose device provided separately from the printing apparatus 1. Any one or a combination of both of the first generation printing process and the second generation printing process may be executed. The printing apparatus 1 may change a configuration of the conveyance device 5 according to a type of the print head 6. The conveyance device 5 may change the relative position between the print head 6 and the print medium T by moving the print head 6. The communication device 4 may have any configuration so long as it is configured to communicate with the external device 99 wirelessly or by wire.

A program containing commands for executing the setting process, the first generation printing process, and the second generation printing process may be stored in a storage device of the printing apparatus 1 by the time the CPU 7 executes the corresponding program. Therefore, each of the program obtaining methods, the obtaining paths, and the devices storing the program may be changed as appropriate. The program executed by each printing apparatus 1 may be received from other devices via cable or wireless communication to be stored in the storage device such as a storage device. Other devices include, for example, PCs and servers connected via a network.

Each step of the setting process, the first generation printing process, and the second generation printing process is not limited to the example of being executed by the CPU 7, and may be partially or fully executed by another electronic device (for example, ASIC). Each step of the setting process, the first generation printing process, and the second generation printing process may be distributed and processed by a plurality of electronic devices (for example, a plurality of CPUs). Each step of the setting process, the first generation printing process, and the second generation printing process may be changed in order, omitted, or added as necessary. The following changes may be added to the setting process, the first generation printing process, and the second generation printing process as appropriate.

In the combining generation process (S40) of the first generation printing process, the CPU 7 may compose the lines of the third portion of the P-th divided image for which the printing operation is stopped and the lines of the first portion of the (P+1)-th divided image to generate the print data corresponding to the third portion of the P-th divided image. In this case, after performing the printing based on the print data generated by the process, the CPU 7 performs the printing from the line of the second portion in the (P+1)-th divided image on which the shifting process is performed.

In the second thinning generation process (S40) of the first generation printing process, the CPU 7 may compose the lines of the third portion of the P-th divided image for which the printing operation is stopped and the lines of the first portion of the (P+1)-th divided image to generate the print data corresponding to the first portion of the (P+1)-th divided image. In this case, after performing the printing based on the print data generated by the process, the CPU 7 performs the printing from the line of the second portion in the (P+1)-th divided image obtained by performing the thinning process. The above modified examples may be combined as appropriate within the consistent range.

In the above embodiment, the CPU 7 is an example of the control device of the present disclosure. The processes of S11, S38, and S57 are examples of the obtaining process of the present disclosure. The processes of S32 to S34, S40, S42, S53, S60, S61, and S64 are examples of the generation process of the present disclosure. The process of combining the plurality of lines into one line in the shifting process and the thinning process is an example of the first combining process or the combining process of the present disclosure.

The processes of S35, S43, S54, S62, S75, and S80 are examples of the printing process of the present disclosure. The processes of S31 and S51 are examples of the print determination process of the present disclosure. The processes of S40 and S64 are examples of the second combining process of the present disclosure. The image data indicating the divided image is an example of divided data of the present disclosure. The image data indicating the input image is an example of non-divided data of the present disclosure. The process of S13 is an example of the image data determination process of the present disclosure. The processes of S44 and S66 are examples of the first generation process of the present disclosure. The print data generated by the processes of S44 and S66 are examples of the first print data of the present disclosure. The process of S74 is an example of the second generation process of the present disclosure. The print data generated in S74 is an example of the second print data of the present disclosure. An example of the designation signal of the present disclosure is the instruction signal for setting the shifting process and the thinning process. The process of S1 is an example of the reception process of the present disclosure.

What is claimed is:

1. A printing apparatus comprising:
   a print head having a plurality of elements arranged in a main scanning direction;
   a conveyance device configured to relatively move a print medium and the print head in a sub-scanning direction, the sub-scanning direction intersecting the main scanning direction; and
   a control device configured to control the print head and the conveyance device, the control device being configured to:
   obtain image data;
   determine whether the obtained image data is divided data or non-divided data, the divided data indicating each of a plurality of divided images obtained by dividing input image in the sub-scanning direction, the non-divided data indicating the input image itself;
   in a case the image data is determined to be the non-divided data, generate first print data for printing a first print image corresponding to the input image based on the non-divided data, the generating of the first print data comprising:
   combining at least two lines of a plurality of lines obtained by dividing the input image in a unit of printing in the sub-scanning direction to form at least one line of the plurality of lines composing the first print image;
   in a case the image data is determined to be the divided data, generate second print data for printing second print image corresponding to each of the divided images based on the divided data; and
   print the print image based on the generated first print data or the generated second print data, the printing of the print image comprising:
   controlling the conveyance device to relatively move the print medium and the print head in the sub-scanning direction;
   controlling the print head to drive the plurality of elements; and
   forming dots for each line of the plurality of lines composing the first print image or each line of a plurality of lines composing the second print image.

2. The printing apparatus according to claim 1, wherein in the combining, the control device is configured to shift dots composing the input image in the sub-scanning direction to form dots composing the first print image.

3. The printing apparatus according to claim 1, wherein in the combining, the control device is configured to change dots composing the lines in one print data of the first print data by referring to next print data next to the one print data.

4. The printing apparatus according to claim 1, further comprising:
   an input device,
   wherein the control device is further configured to:
   receive a designation signal designating performing of the combining via the input device; and
   in the case the image data is determined to be the divided data before receiving the designation signal, prohibit the receiving of the designation signal.

5. The printing apparatus according to claim 1, further comprising:
   an input device,
   wherein the control device is further configured to:
   receive a designation signal designating performing of the combining via the input device; and
   in the case the image data is determined to be the divided data, invalidate the receiving of the designation signal.

6. The printing apparatus according to claim 4, wherein in the case the image data is determined to be the divided data, the control device is further configured to notify that the combining is cannot be performed.

* * * * *